US011769029B2

(12) United States Patent
Roessner

(10) Patent No.: US 11,769,029 B2
(45) Date of Patent: Sep. 26, 2023

(54) CARD WITH FINGERPRINT BIOMETRICS

(71) Applicant: Advanide Holdings Pte. Ltd., Singapore (SG)

(72) Inventor: Holger Roessner, Singapore (SG)

(73) Assignee: Advanide Holdings Pte. Ltd., Singapore (SG)

( * ) Notice: Subject to any disclaimer, the term of this patent is extended or adjusted under 35 U.S.C. 154(b) by 9 days.

(21) Appl. No.: 17/598,326

(22) PCT Filed: Apr. 1, 2020

(86) PCT No.: PCT/SG2020/050199
§ 371 (c)(1),
(2) Date: Sep. 27, 2021

(87) PCT Pub. No.: WO2020/204831
PCT Pub. Date: Oct. 8, 2020

(65) Prior Publication Data
US 2022/0180142 A1    Jun. 9, 2022

(30) Foreign Application Priority Data

Apr. 1, 2019  (SG) .......................... 10201902933W

(51) Int. Cl.
*G06K 19/06* (2006.01)
*G06K 19/073* (2006.01)
*G06K 19/077* (2006.01)

(52) U.S. Cl.
CPC . *G06K 19/07354* (2013.01); *G06K 19/07773* (2013.01)

(58) Field of Classification Search
CPC ......... G06K 19/0718; G06K 19/07354; G06K 19/0723; G06K 19/0716; G06Q 20/40145; G06Q 20/34

(Continued)

(56) References Cited

U.S. PATENT DOCUMENTS

2007/0235548 A1    10/2007  Singleton
2008/0308641 A1*   12/2008  Finn ................... G06K 19/0723
                                                               235/492

(Continued)

FOREIGN PATENT DOCUMENTS

EP        3336759        6/2018
KR        101706592      2/2017
KR        1020180123085  11/2018

OTHER PUBLICATIONS

Roessner, Holger; International Search Report and Written Opinion for PCT/SG2020/050199, filed Apr. 1, 2020, dated Jul. 17, 2020, 8 pgs.

(Continued)

*Primary Examiner* — Daniel St Cyr
(74) *Attorney, Agent, or Firm* — Taylor English Duma LLP

(57) ABSTRACT

An inlay for a card includes a first transparent overlay sheet, an antenna carrier sheet, a thickness compensation sheet, a second transparent overlay sheet. The inlay also includes a microcontroller, a module lead frame, a finger sensor lead frame, an antenna, and electrical wires. The module lead frame is adapted for being milled and includes a plurality of first contact pads for contacting a contact module. The finger sensor lead frame is adapted for being milled and includes a plurality of second contact pads for contacting a fingerprint sensor. The electrical wires are connected to the microcontroller, to the first contact pads, to the second contact pads, and to the antenna.

14 Claims, 21 Drawing Sheets

(58) Field of Classification Search
USPC .................................................. 235/492, 439
See application file for complete search history.

(56) References Cited

U.S. PATENT DOCUMENTS

| | | | |
|---|---|---|---|
| 2009/0204207 A1* | 8/2009 | Blum | G02C 7/083 |
| | | | 623/4.1 |
| 2013/0207786 A1 | 8/2013 | Hutzler et al. | |
| 2014/0124583 A1 | 3/2014 | Reed | |
| 2016/0170532 A1* | 6/2016 | Suwald | G06F 3/044 |
| | | | 345/174 |
| 2017/0213097 A1* | 7/2017 | Vogel | G06V 40/1365 |
| 2019/0019005 A1* | 1/2019 | Pompeani | G06V 10/147 |

OTHER PUBLICATIONS

Advanide Holdings PTE. LTD.; Extended European Search Report for application No. 20784246.9, dated Nov. 21, 2022, 9 pgs.

* cited by examiner

US 11,769,029 B2

CARD WITH FINGERPRINT BIOMETRICS

TECHNICAL FIELD

Field of Use

This application relates to an improved card with fingerprint biometrics.

SUMMARY

In one aspect, disclosed is an inlay for a card, the inlay comprising: a first transparent overlay sheet, an antenna carrier sheet being provided next to the first transparent overlay sheet, the antenna carrier sheet comprising a microcontroller opening, a contact module lead frame opening, and a finger sensor lead frame opening, a thickness compensation sheet being provided next to the antenna carrier sheet, a second transparent overlay sheet being provided next to the thickness compensation sheet, a microcontroller being provided in the microcontroller opening, a module lead frame being adapted for being milled and being provided in the contact module lead frame opening, the module lead frame comprising a plurality of first contact pads for contacting a contact module, a finger sensor lead frame being adapted for being milled and being provided in the sensor lead frame opening, the sensor lead frame comprising a plurality of second contact pads for contacting a fingerprint sensor, an antenna comprising a coil of a conductor being embedded in the antenna carrier sheet, and a plurality of electrical wires being connected to the microcontroller, to the first contact pads, to the second contact pads, and to the antenna.

In a further aspect, disclosed is a method of producing an inlay, the method comprising: providing an antenna carrier sheet, providing the antenna carrier sheet with a first opening for receiving a printed circuit board of a microcontroller, a second opening for receiving a module lead frame and a third opening for receiving a sensor lead frame, providing an adhesive tape next to the antenna carrier sheet, inserting the printed circuit board into the first opening, inserting the module lead frame into the second opening, inserting the sensor lead frame into the third opening, wherein the printed circuit board, the module lead frame, and the sensor lead frame are attached to the adhesive tape, embedding an antenna comprising a coil of a conductor in the antenna carrier sheet, attaching a plurality of electrical wires to electrical contact pads of the printed circuit board, to the module lead frame, to the sensor lead frame, and to the antenna, providing a thickness compensation sheet with an opening to receive a molded part of the microcontroller, providing the thickness compensation sheet next to the antenna carrier sheet, removing the adhesive tape from the antenna carrier sheet, providing a first transparent overlay sheet next to the antenna carrier sheet, and providing a second transparent overlay sheet next to the thickness compensation sheet.

In yet another aspect, disclosed is a card comprising: an inlay comprising a first transparent overlay sheet, an antenna carrier sheet being provided next to the first transparent overlay sheet, the antenna carrier sheet comprising a microcontroller opening, a module lead frame opening, and a sensor lead frame opening, a thickness compensation sheet being provided next to the antenna carrier sheet, a second transparent overlay sheet being provided next to the thickness compensation sheet, a microcontroller being provided in the microcontroller opening, first contact pads of a module lead frame being provided in the module lead frame opening, second contact pads of a sensor lead frame being provided in the sensor lead frame opening, an antenna comprising a coil of conductor being embedded in the antenna carrier sheet, a plurality of electrical wires being connected to the microcontroller, to the first contact pads, to the second contact pads, and to the antenna; a first printed PVC sheet being provided next to a first transparent overlay sheet of the inlay, a first transparent PVC sheet being provided next to the first printed PVC sheet, a second printed PVC sheet being provided next to a second transparent overlay sheet of the inlay, and a second transparent PVC sheet being provided next to the second printed PVC sheet, wherein: the first transparent PVC sheet, the first printed PVC sheet, and the first transparent overlay sheet comprise a contact module opening and a fingerprint sensor opening, a contact module is provided in the contact module opening and is electrically connected to the first contact pads via an electrically conductive substance, and a fingerprint sensor is provided in the fingerprint sensor opening and is electrically connected to the second contact pads via an electrically conductive substance.

DETAILED DESCRIPTION

Figure 1:
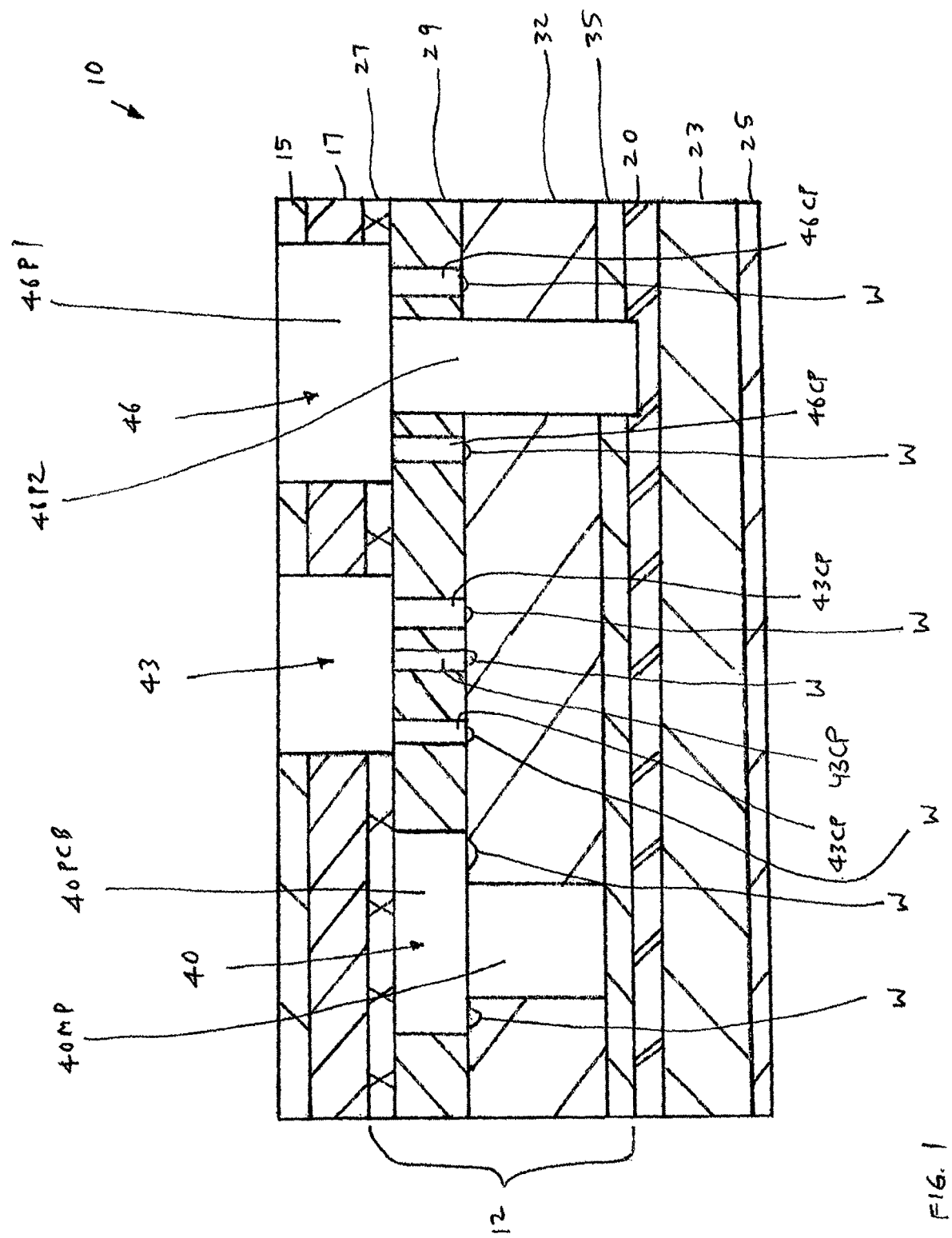
FIG. 1 illustrates a cross-sectional view of an improved card with fingerprint biometrics.

In the following description, details are provided to describe embodiments of the application. It shall be apparent to one skilled in the art, however, that the embodiments may be practised without such details.

Some parts of the embodiments have similar parts. The similar parts may have the same names or the similar part numbers with an alphabet symbol. The description of one similar part also applies by reference to another similar part, where appropriate, thereby reducing repetition of text without limiting the disclosure.

The card can be used to identify securely an individual using biometric analysis. The card has a processor with an internal memory and a biometric sensor. In use, a user connects the card to a scanner directly using physical electrical contacts or remotely using an electromagnetic interface. The memory often stores data for the purpose of encryption. The biometric sensor is intended for obtaining a physical trait of the user, namely fingerprint.

It is an object of this application to provide an improved card with fingerprint biometrics.

The application provides an inlay for a biometric card.

The inlay includes a first transparent overlay sheet, an antenna carrier sheet, a thickness compensation sheet, and a second transparent overlay sheet, and several components.

In detail, the antenna carrier sheet is provided next to the first transparent overlay sheet, and it includes a microcontroller opening, a contact module lead frame opening, and a finger sensor lead frame opening.

The thickness compensation sheet is provided next to the first transparent overlay sheet.

The second transparent overlay sheet is provided next to the thickness compensation sheet.

The components include a microcontroller, a module lead frame, a finger sensor lead frame, an antenna, and a plurality of electrical wires The microcontroller is also called a processing module, such as a secure processing module. It is placed in the microcontroller opening.

The module lead frame is adapted for being milled or cut, and it is placed in the contact module lead frame opening. The module lead frame comprises a plurality of first contact pads for contacting a card contact module.

The lead frame refers to a metal structure for carrying an electrical signal from one part of the lead frame to another part of the lead frame. The card contact module is intended for contacting a card reader to exchanged information with the card reader.

Similarly, the finger sensor lead frame is adapted for being milled or cut, and it is provided in the sensor lead frame opening, the sensor lead frame comprising a plurality of second contact pads for contacting a fingerprint sensor.

The antenna includes a coil of an electrical conductor being embedded in the antenna carrier sheet. The antenna is intended for receiving energy or signal from an external source and for transmitting the energy or signal to electrical components of the card.

The electrical wires are electrically connected to electric contact pads of the microcontroller, to the first contact pads, to the second contact pads, and to the electrical conductor of the antenna.

This inlay allows easy change of electrical connections between electrical components. In other words, a user can another finger sensor or contact module with different pin out with only a little effort to assign the electrical wires to different pins.

One or more electrical wire can overlap with another electrical wire. This overlap allows flexible arrangement of electrical wires.

An intermediate transparent PVC sheet can be provided next to the second transparent overlay sheet. In other words, the inlay can include one or more additional sheet or layer. The additional sheet enables the inlay to have different properties to meet different needs of use, such as additional layers for enhanced protection.

The application provides a method of producing an inlay.

The method includes a step of providing an antenna carrier sheet.

After this, the antenna carrier sheet is milled, cut, or punched to provide the antenna carrier sheet with several openings, namely a first opening, a second opening, and a third opening.

The first opening is intended for receiving a part of the microcontroller, namely a printed circuit board of the microcontroller. In other words, the first opening is adapted for receiving the printed circuit board. Similarly, the second opening is intended for receiving a module lead frame while the third opening is intended for receiving a sensor lead frame.

An adhesive tape is then placed next to the antenna carrier sheet such that the antenna carrier sheet is attached to an adhesive layer of the adhesive tape.

The antenna carrier sheet is later placed on a supporting surface, wherein the adhesive tape is resting on the supporting surface. This is to allow easy placement of parts into the openings of the antenna carrier sheet.

The printed circuit board is afterward inserted into the first opening, wherein the printed circuit board is attached to the adhesive tape. Likewise, the module lead frame is inserted into the second opening such that the module lead frame is attached to the adhesive tape. The sensor lead frame is inserted into the third opening, wherein the sensor lead frame is attached to the adhesive tape. The adhesive tape then keeps the printed circuit board, the module lead frame, and the sensor lead frame from moving with respect to the adhesive tape.

An antenna comprising a coil of an electrical conductor is later embedded in the antenna carrier sheet. The embedding fixes the coil of the electrical conductor to the antenna carrier sheet. In a general sense, this step of embedding can be also be done before or after the above step of placing the adhesive tape next to the antenna carrier sheet.

A plurality of electrical wires is afterwards attached to electrical contact pads of the printed circuit board, to electrical contact pads of the module lead frame, to electrical contact pads of the sensor lead frame, and to the electrical conductor of the antenna.

A thickness compensation sheet is provided with an opening to receive a moulded part of the microcontroller. The printed circuit board is electrically attached to one or more semiconductor chips while the moulded part covers and protects the semiconductor chips.

The thickness compensation sheet is then placed next to the antenna carrier sheet such that the opening receives the moulded part of the microcontroller.

The adhesive tape is afterwards removed from the antenna carrier sheet.

A first transparent overlay sheet is afterwards provided next to the antenna carrier sheet. The first transparent overlay sheet touches the antenna carrier sheet.

A second transparent overlay sheet is also placed next to the thickness compensation sheet, wherein the second transparent overlay sheet touches the thickness compensation sheet. This step can be done before or after the step of removing the adhesive tape from the antenna carrier sheet.

After this, the first transparent overlay sheet, the antenna carrier sheet, the thickness compensation sheet, and the second transparent overlay sheet are then laminated, wherein these sheets are pressed against each other to form the complete or final inlay 12.

The method can include a further step of providing an intermediate transparent PVC sheet next to the second transparent overlay sheet. The intermediate transparent PVC sheet then touches the second transparent overlay sheet.

The application provides a biometric card. The card includes an inlay.

The inlay comprises a first transparent overlay sheet, an antenna carrier sheet, a thickness compensation sheet, a second transparent overlay sheet, a microcontroller, first contact pads of a module lead frame, second contact pads of a sensor lead frame, an antenna, and a plurality of electrical wires.

In particular, the antenna carrier sheet is provided next to the first transparent overlay sheet and it comprises a microcontroller opening, a module lead frame opening, and a sensor lead frame opening.

The thickness compensation sheet is provided next to the first transparent overlay sheet.

The second transparent overlay sheet is provided next to the thickness compensation sheet.

The microcontroller is provided in the microcontroller opening.

The first contact pads of the module lead frame are provided in the module lead frame opening.

The second contact pads of the sensor lead frame are provided in the sensor lead frame opening.

The antenna includes a coil of electrical conductor being embedded in the antenna carrier sheet.

The electrical wires are electrically connected to contact pads of the microcontroller, to the first contact pads, to the second contact pads, and to the electrical conductor of the antenna.

The card also includes a first printed PVC sheet, a first transparent PVC sheet, a second printed PVC sheet, a second transparent PVC sheet, a fingerprint sensor, and a contact module.

In detail, the first printed PVC sheet is provided next to a first transparent overlay sheet of the inlay.

The first transparent PVC sheet is provided next to the first printed PVC sheet.

The second printed PVC sheet is provided next a second transparent overlay sheet of the inlay.

The second printed PVC sheet is provided next to the intermediate transparent PVC sheet.

The second transparent PVC sheet is provided next to the second printed PVC sheet. The first transparent PVC sheet, the first printed PVC sheet, and the first transparent overlay sheet comprise a contact module opening and a fingerprint sensor opening.

The contact module is provided in the contact module opening and it is electrically connected to the first contact pads.

The fingerprint sensor is provided in the fingerprint sensor opening and it is electrically connected to the second contact pads.

An intermediate transparent PVC sheet can be provided between the second transparent overlay sheet and the second printed PVC sheet.

One or more electrical wires can overlap with another electrical wire.

The card often includes a first electrically conductive substance for electrically connecting the contact module to the first contact pads.

Similarly, the card often includes a second electrically conductive substance for electrically connecting the fingerprint sensor to the second contact pads.

The application provides a method of producing a card.

The method includes a step of providing the above-mentioned inlay.

A first printed PVC sheet is then provided next to a first transparent overlay sheet of the inlay. After this, a first transparent PVC sheet is provided next to the first transparent PVC sheet.

A second printed PVC sheet is later provided next to a second transparent overlay sheet of the inlay. Following this, a second transparent PVC sheet is provided next to the second printed PVC sheet. In a general sense, the second printed PVC sheet can be provided before or after the step of providing the first printed PVC sheet.

A first major surface of the first transparent PVC sheet is afterwards milled or cut such that a module lead frame body of a module lead frame is electrically detached from module lead frame contact pads of the module lead frame. In other words, the module lead frame contact pads are electrically isolated from each other.

Similarly, the first major surface is milled or cut such that a sensor lead frame body of a sensor lead frame is electrically detached from sensor lead frame contact pads of the sensor lead frame. The sensor lead frame contact pads are electrically isolated from each other.

The first major surface is milled or cut for providing a first recess to receive a contact module.

Similarly, the first major surface is also milled or cut for providing a second recess to receive a fingerprint sensor.

In a general sense, the above-mentioned steps of milling can be done different orders or sequences. The step of detaching the module lead frame contact pads from each other can be done before or after the step of detaching the sensor lead frame contact pads from each other. The step of milling to provide the first recess can be done before or after the step of milling to provide the second recess. The step of milling to provide the first or second recess can be done before or after the step of detaching the module lead frame contact pads or detaching the sensor lead frame contact pads from each other.

The method often includes a step of inserting a contact module into the first recess, wherein the contact module is electrically connected to the module lead frame contact pads and a step of inserting a fingerprint sensor into the second recess, wherein the fingerprint sensor is electrically connected to the sensor lead frame contact pads.

A first electrically conductive substance is often provided to electrically connect the contact module to the module lead frame contact pads.

A second electrically conductive substance is often provided to electrically connect the fingerprint sensor to the sensor lead frame contact pads.

FIG. 1 shows a card 10 with fingerprint biometrics.

The card 10 includes an improved inlay 12, a plurality of flat sheets, and a plurality of electronic modules.

The inlay 12 and the flat sheets have essentially the same rectangular shape. The inlay 12 and the flat sheets are arranged in a stack, wherein an outer edge of the inlay 12 is placed next to outer edges of the flat sheets. The inlay 12 is positioned between the flat sheets. The electronic modules are embedded in the flat sheets and in the inlay 12.

Referring to the flat sheets, they include a first transparent polyvinyl chloride (PVC) sheet 15, a first printed PVC sheet 17, an intermediate transparent PVC sheet 20, and a second printed PVC sheet 23, and a second transparent PVC sheet 25.

Figure 2:
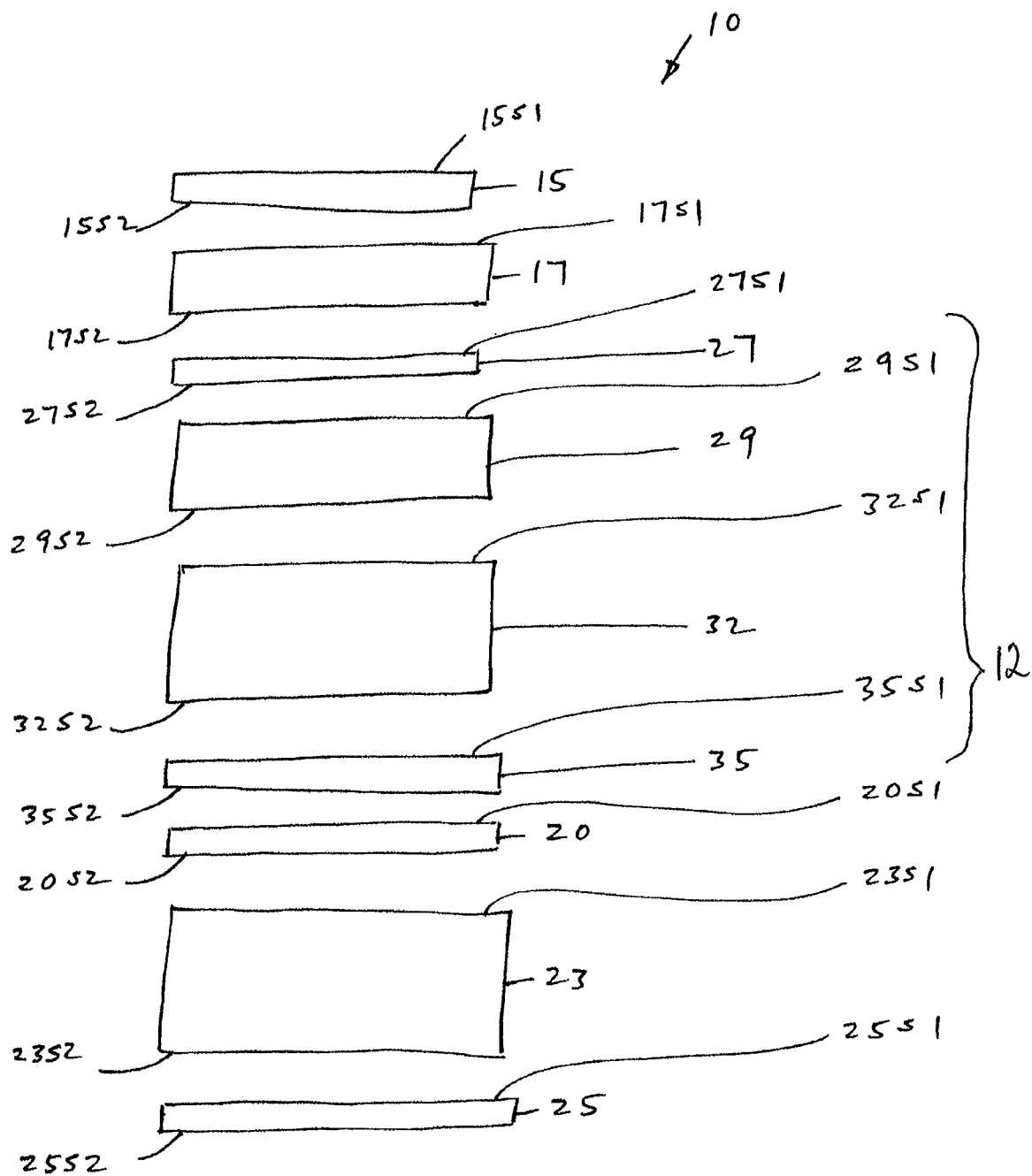
FIG. 2 illustrates an exploded view of a plurality of sheets of the card of FIG. 1.

As seen in FIG. 2, a first major surface 15S1 of the first transparent PVC sheet 15 acts as an external surface of the chip 10 that a user can touch. A second major surface 15S2 of the first transparent PVC sheet 15 is placed next to a first major surface 17S1 of the first printed PVC sheet 17. The second major surface 15S1 is positioned opposite the first major surface 15S2.

A second major surface 17S2 of the first printed PVC sheet 17 is placed next to a first major surface of the inlay 12. The second major surface 17S2 is positioned opposite the first major surface 17S1.

A second major surface of the inlay 12 is placed next to a first major surface 20S1 of the intermediate transparent PVC sheet 20. The second major surface of the inlay 12 is positioned opposite the first major surface of the inlay 12.

A second major surface 20S2 of the intermediate transparent PVC sheet 20 is placed next to a first major surface 23S1 of the second printed PVC sheet 23. The second major surface 20S2 is positioned opposite the first major surface 20S1.

A second major surface 23S2 of the second printed PVC sheet 23 is placed next to a first major surface 25S1 of the second transparent PVC sheet 25. The second major surface 23S2 is positioned opposite the first major surface 23S1.

A second major surface 25S2 of the second transparent PVC sheet 25 acts as an external surface of the chip 10 that a user can touch. The second major surface 25S2 is positioned opposite the first major surface 25S1.

Referring to the inlay 12, it includes a first transparent overlay sheet 27, an antenna carrier sheet 29, a thickness compensation sheet 32, a second transparent overlay sheet 35. The antenna carrier sheet 29 is also called an antenna sheet.

A first major surface 27S1 of the first transparent overlay sheet 27 is placed next to the second major surface 17S2 of the first printed PVC sheet 17.

A second major surface 27S2 of the first transparent overlay sheet 27 is placed next to a first major surface 29S1 of the antenna carrier sheet 29. The second major surface 27S2 is positioned opposite the first major surface 27S1.

A second major surface 29S2 of the antenna carrier sheet 29 is placed next to a first major surface 32S1 of the thickness compensation sheet 32. The second major surface 29S2 is positioned opposite the first major surface 29S1.

A second major surface 32S2 of the thickness compensation sheet 32 is placed next to a first major surface 35S1 of the second transparent overlay sheet 35. The second major surface 32S2 is positioned opposite the first major surface 32S1.

A second major surface 35S2 of the second transparent overlay sheet 35 is placed next to the first major surface 20S1 of the intermediate transparent PVC sheet 20. The second major surface 35S2 is position opposite the first major surface 35S1.

Referring to the electronic modules as seen in FIG. 1, they include a secure processing module 40, a contact module 43 with contact pads 43CP of a millable module lead frame, a fingerprint sensor 46 with lead frame contact pads 46CP of a millable sensor lead frame, and a plurality of module electrical wires W. The secure processing module 40 is also called a computing processor or a microcontroller. The module lead frame and the sensor lead frame are adapted for milled or cut. In other words, the material and design of the module lead frame and the sensor lead frame are selected such that the module lead frame and the sensor lead frame are suitable for being milled.

Regarding the secure processing module 40, it includes a printed circuit board (PCB) 40PCB and a moulded part 40MP. One end of the moulded part 40MP is attached to a surface of the PCB 40PCB.

The PCB 40PCB includes an essentially rectangular sheet, one or more semiconductor chips, and several electrical contact pads.

The rectangular sheet of the PCB 40PCB comprises a composite material that is flame resistant. The composite material includes a woven fiberglass cloth with an epoxy resin binder.

The electrical contact pads are placed on outer parts or edges of a contact surface of the rectangular sheet.

The semiconductor chips are placed on an inner or central part of the above-mentioned contact surface of the rectangular sheet of the PCB 40PCB. The semiconductor chips are electrically connected to the electrical contact pads via a plurality of chip electrical wires.

The moulded part 40MP has a shape essentially of a rectangular block. The moulded part 40MP is attached to the contact surface of the rectangular sheet of the PCB 40PCB and it encapsulates and covers the semiconductor chips.

The rectangular sheet of the PCB 40PCB and the antenna carrier sheet 29 have about the same thickness. Similarly, the moulded part 40MP has a height that is about the same as the thickness of the compensation sheet 32.

The rectangular sheet of the PCB 40PCB is inserted in an opening of the antenna carrier sheet 29 while the moulded part 40MP is inserted in an opening of the compensation sheet 32. The insertion is done such that the contact surface of the rectangular sheet is aligned with the second major surface 29S2 of the antenna carrier sheet 29.

Regarding the contact module 43, it has a shape essentially of a rectangular block. The contact module 43 has a first surface and a second surface that is placed opposite the first surface. The first surface includes a plurality of external module contact pads. The second surface includes a plurality of inner module contact pads. The external module contact pads are adapted for contacting electrical terminals of a card reader (not shown here).

The contact module 43 is inserted in an opening of the first transparent PVC sheet 15, an opening of the first printed PVC sheet 17, and an opening of the first transparent overlay sheet 27. The insertion is done such that the first surface of the contact module 43 is aligned essentially with the first major surface 15S1 of the first transparent PVC sheet 15 and that the second surface of the contact module 43 is aligned essentially with the first major surface 29S1 of the antenna carrier sheet 29.

Figure 3:
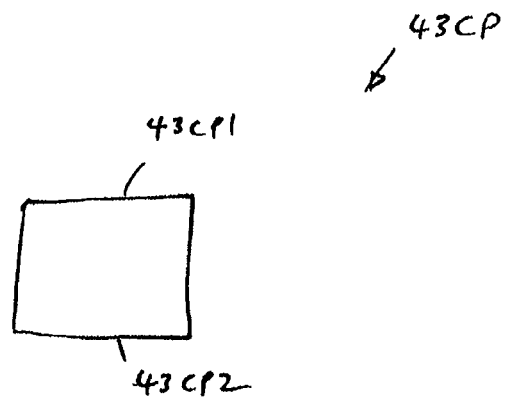
FIG. 3 illustrates a contact pad of a module lead frame of the card of FIG. 1.

As seen in FIGS. 1 and 3, the module lead frame contact pads 43CP have a thickness that is about the same as the thickness of the antenna carrier sheet 29. The module lead frame contact pads 43CP are inserted in an opening of the antenna carrier sheet 29. The insertion is done such that first ends 43CP1 of the module lead frame contact pads 43CP lie in a plane of the first major surface 29S1 of the antenna carrier sheet 29. These first ends 43CP1 of the module lead frame contact pads 43CP are also placed next to the above-mentioned corresponding inner module contact pads. The module lead frame contact pads 43CP are also electrically connected to the inner module contact pads via an electrically conductive substance, such as an Anisotropic Conductive Film (ACF) adhesive.

Second ends 43CP2 of the module lead frame contact pads 43CP lie in a plane of the second major surface 29S2 of the antenna carrier sheet 29.

Regarding the fingerprint sensor 46, it includes a first rectangular part 46P1 and a second rectangular part 46P2, which is attached to the first rectangular part 46P1, as seen in FIG. 1.

The first rectangular part 46P1 has a first surface and a second surface that is placed opposite the first surface. The first surface includes a plurality of external sensor contact pads. The second surface includes a plurality of inner sensor contact pads. The external sensor contact pads are adapted for contacting a finger of a user (not shown here) to sense and obtain fingerprint information of the finger.

The first rectangular part 46P1 is inserted in an opening of the first transparent PVC sheet 15, an opening of the first printed PVC sheet 17, and an opening of the first transparent overlay sheet 27. The insertion is done such that the first surface of the first rectangular part 46P1 is aligned essentially with the first major surface 15S1 of the first transparent PVC sheet 15 and that the second surface of the first rectangular part 46P1 is aligned essentially with the first major surface 29S1 of the antenna carrier sheet 29.

Figure 4:
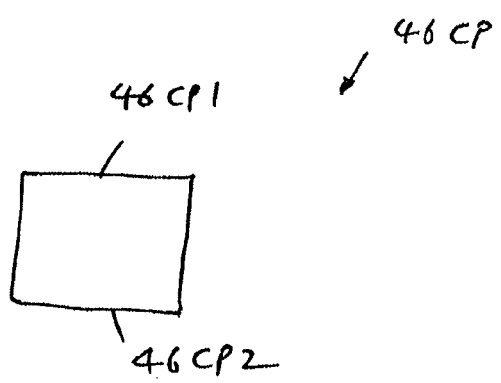
FIG. 4 illustrates a sensor contact pad of a sensor lead frame of the card of FIG. 1.

As seen in FIGS. 1 and 4, the sensor lead frame contact pads 46CP have a thickness that is about the same as the thickness of the antenna carrier sheet 29. The sensor lead frame contact pads 46CP are inserted in an opening of the antenna carrier sheet 29.

The insertion is done such that first ends 46CP1 of the sensor lead frame contact pads 46CP lie in a plane of the first major surface 29S1 of the antenna carrier sheet 29.

These first ends 46CP1 of the sensor lead frame contact pads 46CP are also placed next to the above-mentioned corresponding inner module contact pads. The sensor lead frame contact pads 46CP are also electrically connected to the inner sensor contact pads via an electrically conductive substance, such as an Anisotropic Conductive Film (ACF) adhesive.

Second ends 46CP2 of the sensor lead frame contact pads 46CP lie in a plane of the second major surface 29S2 of the antenna carrier sheet 29.

Referring to FIG. 1, one end of the second rectangular part 46P2 is attached to an inner part of the second surface of the first rectangular part 46P1.

The second rectangular part 46P2 is inserted in an opening of the antenna carrier sheet 29, an opening of the thickness compensation sheet 32, an opening of the second transparent overlay sheet 35, and a recess of the intermediate transparent PVC sheet 20. The insertion is done such that a first surface of the second rectangular part 46P2 is aligned essentially with the first major surface 29S1 of the antenna carrier sheet 29.

Regarding the module electrical wires W, the module electrical wires W are placed in a plane of the second major surface 29S2 of the antenna carrier sheet 29.

The module electrical wires W are electrically connected to the electrical contact pads of the PCB 40PCB of the secure processing module 40, to the module lead frame contact pads 43CP, which are electrically connected to the corresponding inner module contact pads of the contact module 43, and to the sensor lead frame contact pads 46CP, which are electrically connected to the corresponding inner sensor contact pads of the fingerprint sensor 46.

In this embodiment, the first transparent PVC sheet 15 has a thickness of about 50 microns, the first printed PVC sheet 17 has a thickness of about 100 microns, and the first transparent overlay sheet 27 has a thickness of about 50 microns.

The antenna carrier sheet 29 has a thickness of about 120 microns, the thickness compensation sheet 32 has a thickness of about 250 microns, and the second transparent overlay sheet 35 has a thickness of about 50 microns, The intermediate transparent PVC sheet 20 has a thickness of about 50 microns, the second printed PVC sheet 23 has a thickness of about 150 microns, and the second transparent PVC sheet has a thickness of about 50 microns.

Figure 21:
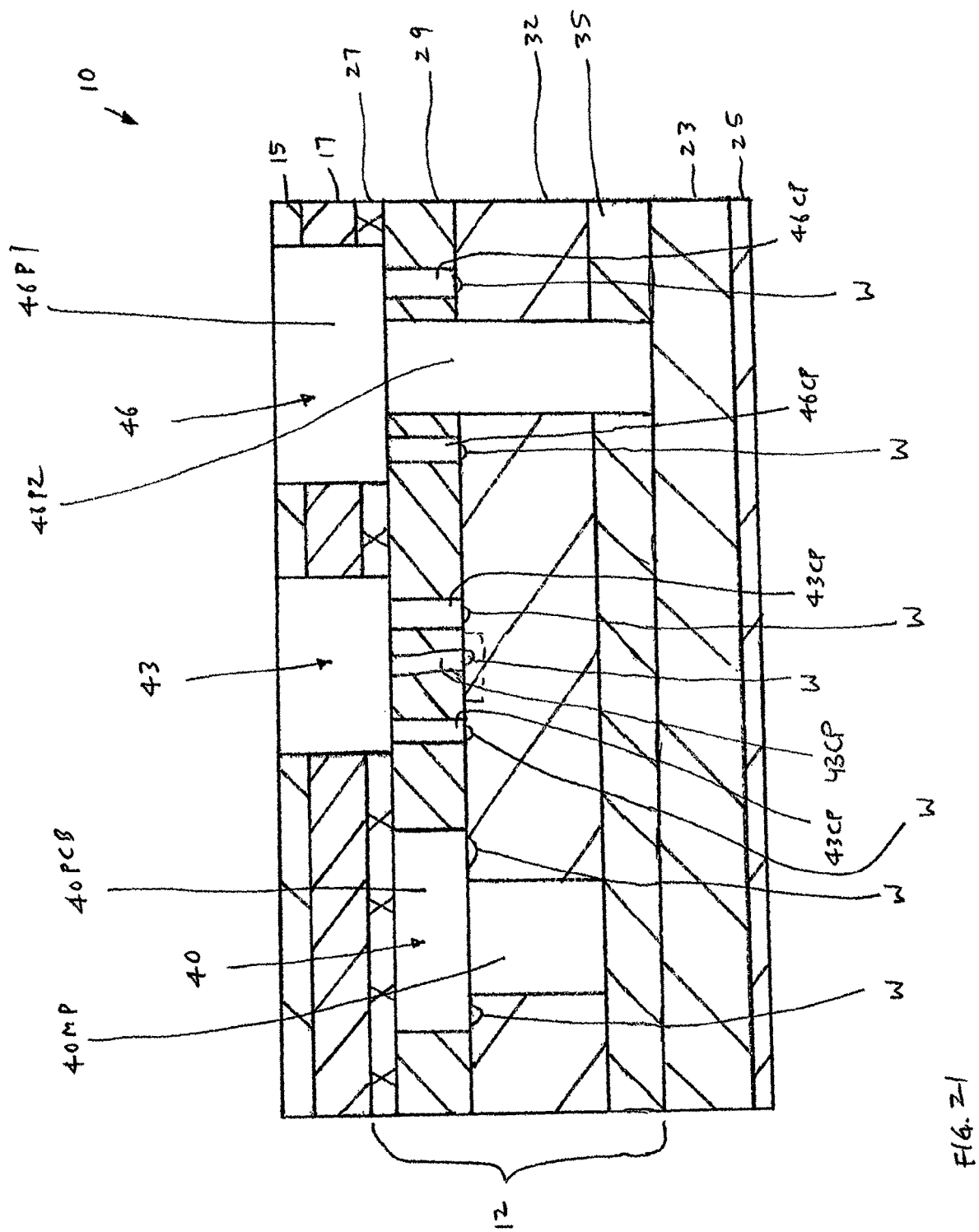
FIG. 21 illustrates a further embodiment of a card in a cross-sectional view.

In a further embodiment shown in FIG. 21, the intermediate transparent PVC sheet 20 is left away. In this further embodiment, the second transparent overlay sheet 35 has a thickness of about 100 microns.

In another implementation, the card has external dimensions that comply with the standard International Organization for Standardization (ISO)/International Electrotechnical Commission (IEC) 7816.

The external module contact pads of the contact module 43 have dimensions that comply with the ISO/IEC 7816.

Functionally, the external sensor contact pads of the fingerprint sensor 46 are intended for contacting a finger of a user for sensing and obtaining fingerprint information of the finger. The fingerprint sensor 46 later sends the fingerprint information to the secure processing module 40.

The external module contact pads of the contact module 43 are intended for contacting electrical terminals of a card reader (not shown here). The external module contact pads allow exchange of data or information between the secure processing module 40 and the card reader.

The secure processing module 40 is used for storing a reference template data. The secure processing module 40 then compares the user fingerprint information with the reference template data. If the secure processing module 40 determines the user fingerprint information matches with the reference template data, then the secure processing module 40 transmits a corresponding match signal to the card reader.

A user can print words and pictures on the first printed PVC sheet 17, wherein the first transparent PVC sheet 15 allows a reader to see these words and pictures, which are printed on the first printed PVC sheet 17.

Similarly, a user can print words and pictures on the second printed PVC sheet 23, wherein the second transparent PVC sheet 25 allows a reader to see these words and pictures, which are printed on the second printed PVC sheet 23.

Figure 5:
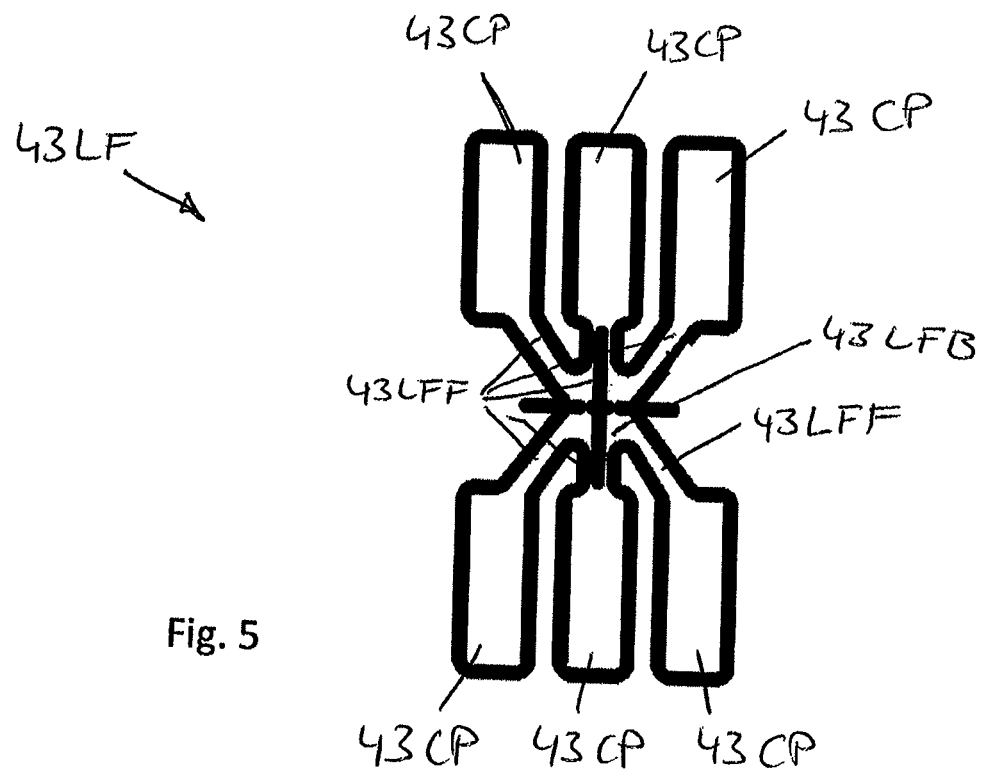
FIG. 5 illustrates parts of the module lead frame.

FIG. 5 shows a module lead frame 43LF. The module lead frame 43LF includes a module lead frame body 43LFB, six module lead frame fingers 43LFF, and six module lead frame contact pads 43CP. The module lead frame body 43LFB is connected to the module lead frame fingers 43LFF. The module lead frame fingers 43LFF are connected to the corresponding module lead frame contact pads 43CP.

Figure 6:
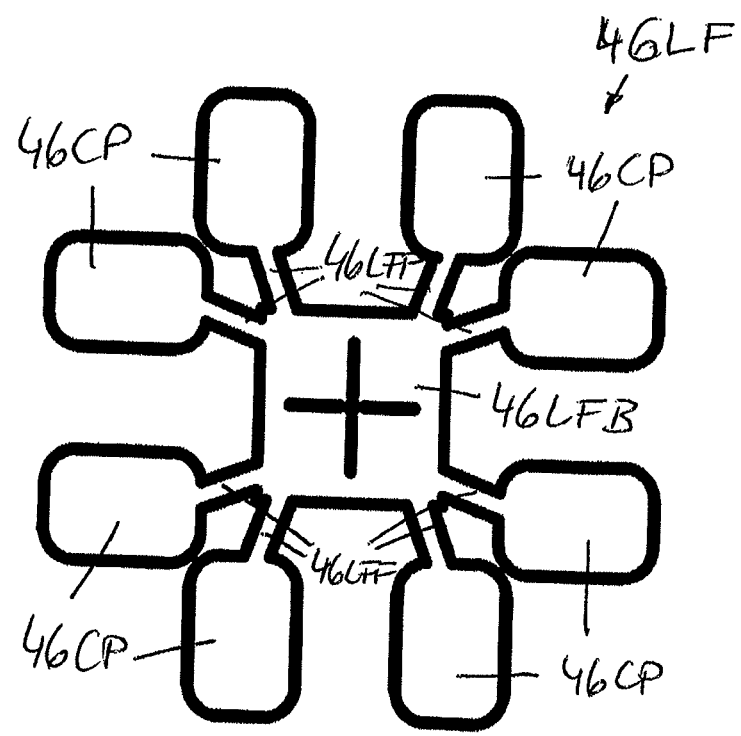
FIG. 6 illustrates parts of the sensor lead frame.

FIG. 6 shows a sensor lead frame 46LF. The sensor lead frame 46LF includes a sensor lead frame body 46LFB, eight sensor lead frame fingers 46LFF, and eight sensor lead frame contact pads 46CP. The sensor lead frame body 46LFB is connected to the sensor lead frame fingers 46LFF. The sensor lead frame fingers 46LFF are connected to the corresponding sensor lead frame contact pads 46CP.

In a general sense, the inlay 12 can include 4 or more layers. As an example, the inlay 12 can have 5 layers, an intermediate transparent PVC sheet being provided next to the second transparent overlay sheet 35.

Similarly, the card 10 can include 8 or more layers. In other words, the card can have 9 or 10 layers.

A method of producing the inlay 12 and the card 10 is described below.

The method includes a step of providing an antenna carrier sheet 29, as one of plurality of antenna carrier sheets in a large material sheet.

Figure 7:
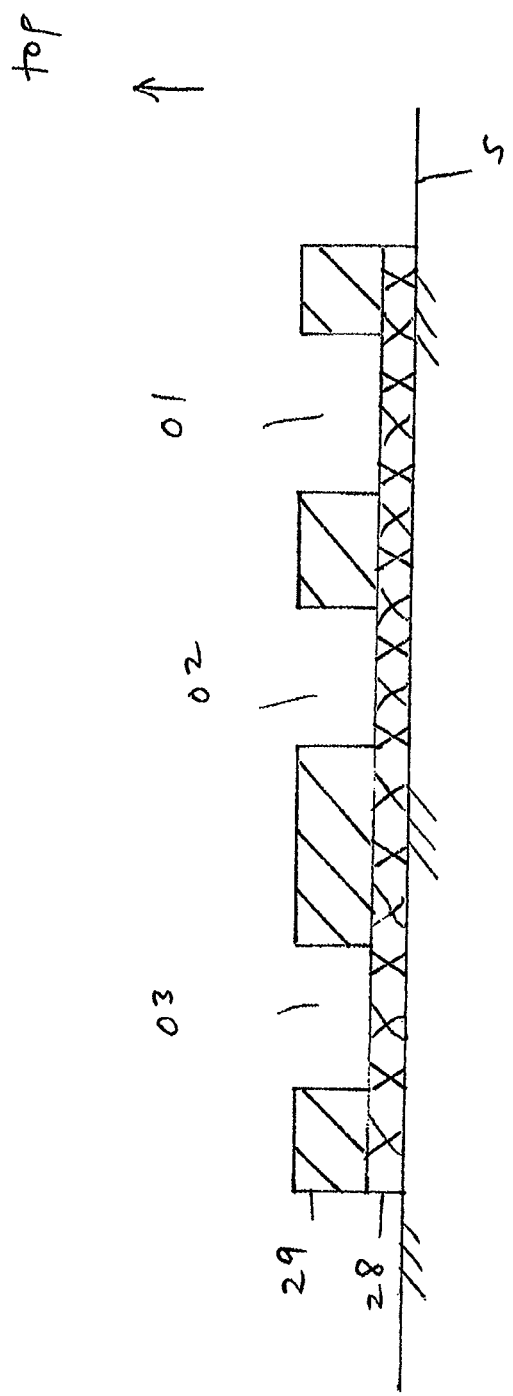
FIG. 7 illustrates one step of producing an inlay for the card of FIG. 1.

After this, the antenna carrier sheet 29 is punched to provide a first opening O1 for receiving the printed circuit board 40PCB of the secure processing module 40, a second opening O2 for receiving a module lead frame 43LF, and a third opening O3 for receiving a sensor lead frame 46LF. This is shown in FIG. 7.

An intermediary self-adhesive tape 28 is then placed on the first major surface 29S1 of the antenna carrier sheet 29 such that the self-adhesive tape 28 covers the antenna carrier sheet 29. The intermediary self-adhesive tape 28 and the antenna carrier sheet 29 are also placed such that a non-adhesive surface of the self-adhesive tape 28 is resting on a support surface S, while a self-adhesive surface of the self-adhesive tape 28 faces the first major surface 29S1. This is shown in FIG. 7.

Figure 8:
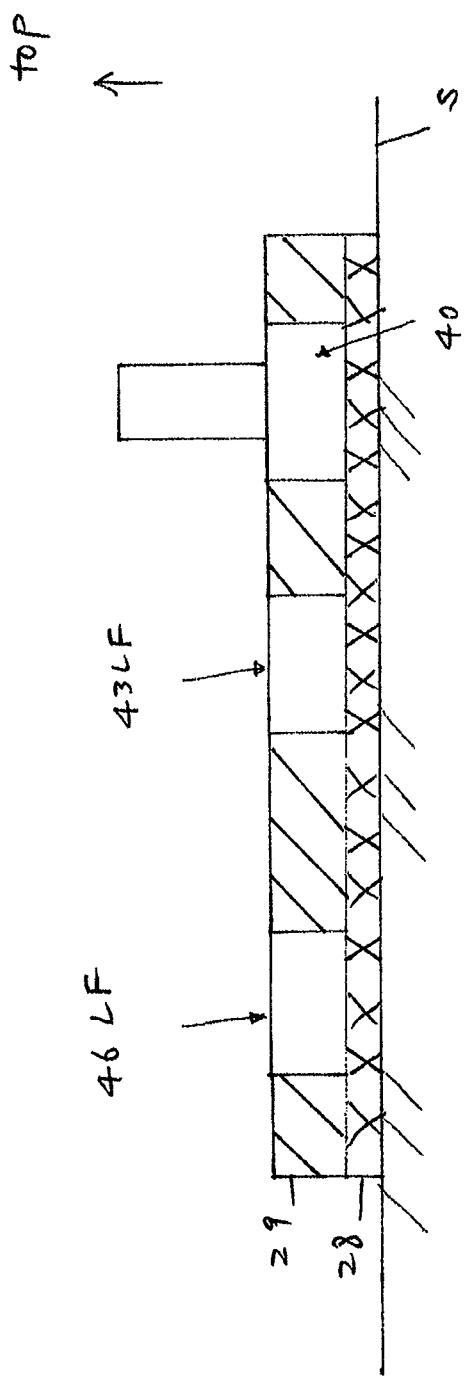
FIG. 8 illustrates a further step of producing the inlay.

A secure processing module 40 is later picked and placed into the first opening O1, wherein the printed circuit board 40PCB of the secure processing module 40 contacts the self-adhesive tape 28 and is attached to the adhesive layer of the self-adhesive tape 28. The adhesive layer acts to fix the printed circuit board 40PCB to the self-adhesive tape 28. In other words, the self-adhesive tape 28 prevents the printed circuit board 40PCB from falling off. The insertion is also done such that the electrical contact pads of the printed circuit board 40PCB lie in the plane of the first major surface 29S1 of the antenna carrier sheet 29, as illustrated in FIG. 8.

Similarly, a module lead frame 43LF is inserted into the second opening O2, wherein the module lead frame 43LF contacts the self-adhesive tape 28 and is attached to the adhesive layer of the self-adhesive tape 28. The adhesive layer acts to fix the module lead frame 43LF to the self-adhesive tape 28. The insertion is also done such that an exposed surface of the module lead frame 43LF lie in the plane of the first major surface 29S1 of the antenna carrier sheet 29, as illustrated in FIG. 8.

A sensor lead frame 46LF is picked and is placed in the third opening O3. wherein the sensor lead frame 46LF contacts the self-adhesive tape 28 and is attached to the adhesive layer of the self-adhesive tape 28. The adhesive layer acts to fix the sensor lead frame 46LF to the self-adhesive tape 28. The insertion is done such that an exposed surface of the sensor lead frame 46LF lie in the plane of the first major surface 29S1 of the antenna carrier sheet 29, as illustrated in FIG. 8.

Figure 22:
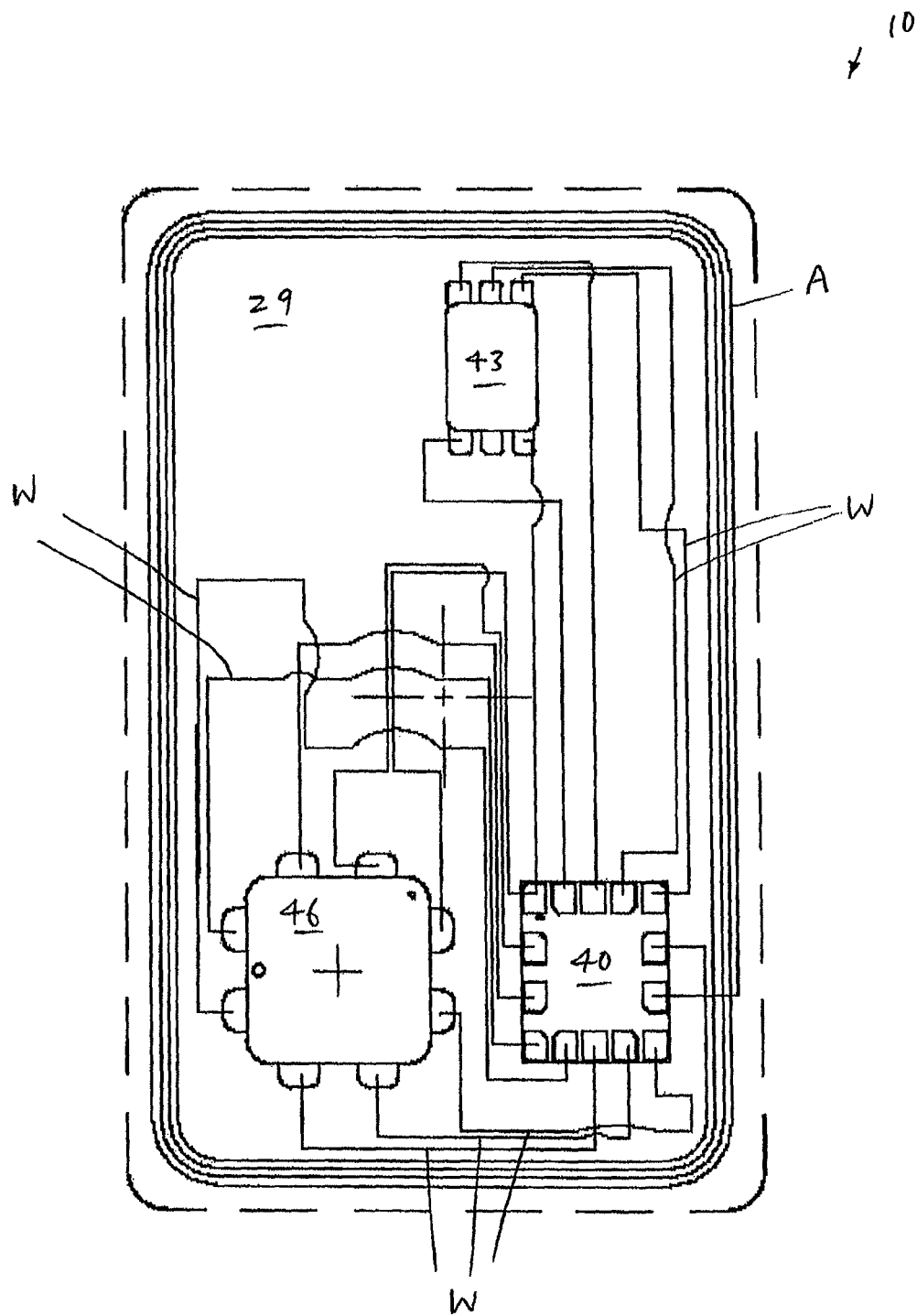
FIG. 22 illustrates a top view of the card of FIG. 1.

An antenna A comprises a coil of electrical conductor is also placed on and is embedded into the antenna carrier sheet 29. In other words, the antenna A is firmly attached to the antenna carrier sheet 29. A heated tool presses the antenna onto the antenna carrier sheet 29, which includes a thermoplastic material. The antenna A is shown in FIG. 22, which shows a view of a top of the cash 10 of FIG. 1 when the layers 27, 29, 17, 15 are transparent.

Figure 9:
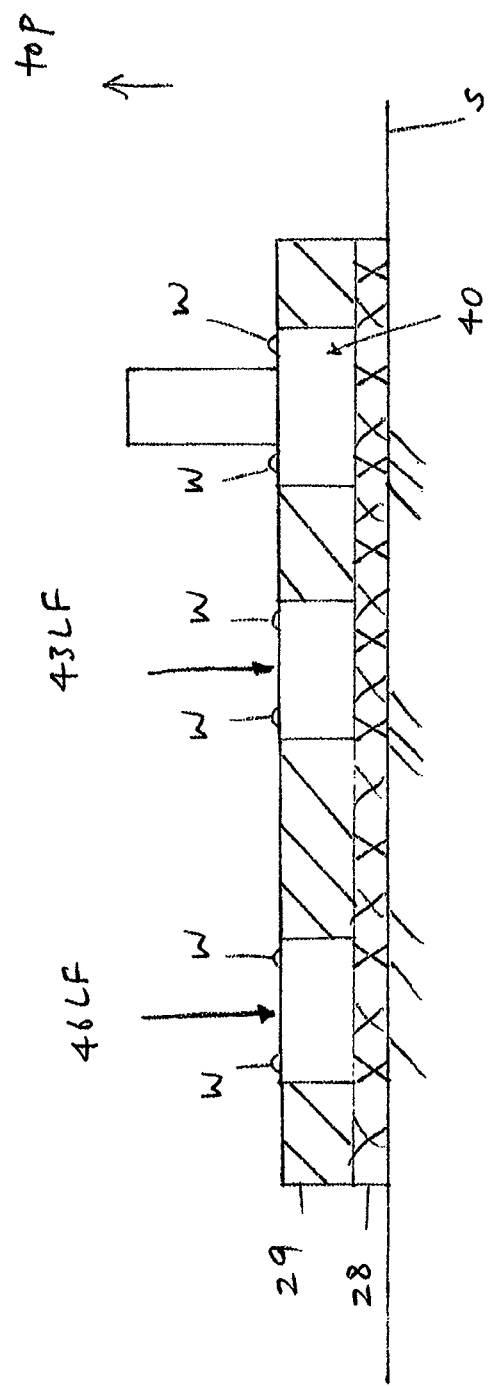
FIG. 9 illustrates another step of producing the inlay.

Electrical wires W are afterward electrically connected to the electrical contact pads of the printed circuit board 40PCB of the secure processing module 40, to the second ends 43CP2 of the module lead frame contact pads 43CP, and to the second ends 46CP2 of the sensor lead frame contact pads 46CP, as illustrated in FIG. 9.

The attachment of the electrical wires W is done using thermal compression bonding.

In a different implementation, the attachment of the electrical wires W is done using ultrasonic bonding. The ultrasonic bonding refers to rubbing together two pieces of metal with high energy such that surface impurities on surfaces of these two metals are scrubbed away and that underlying atoms of the metals are brought into close contact for bonding. The energy for this mechanically rubbing of the two metals is provided by a tool that vibrates mechanically at an ultrasonic frequency.

The electrical wires W also electrically connects the electrical conductor of the antenna A to the electrical contact pads of the printed circuit board 40PCB of the secure processing module 40.

The electrical wires W can overlap each other, as seen in FIG. 22.

Figure 10:
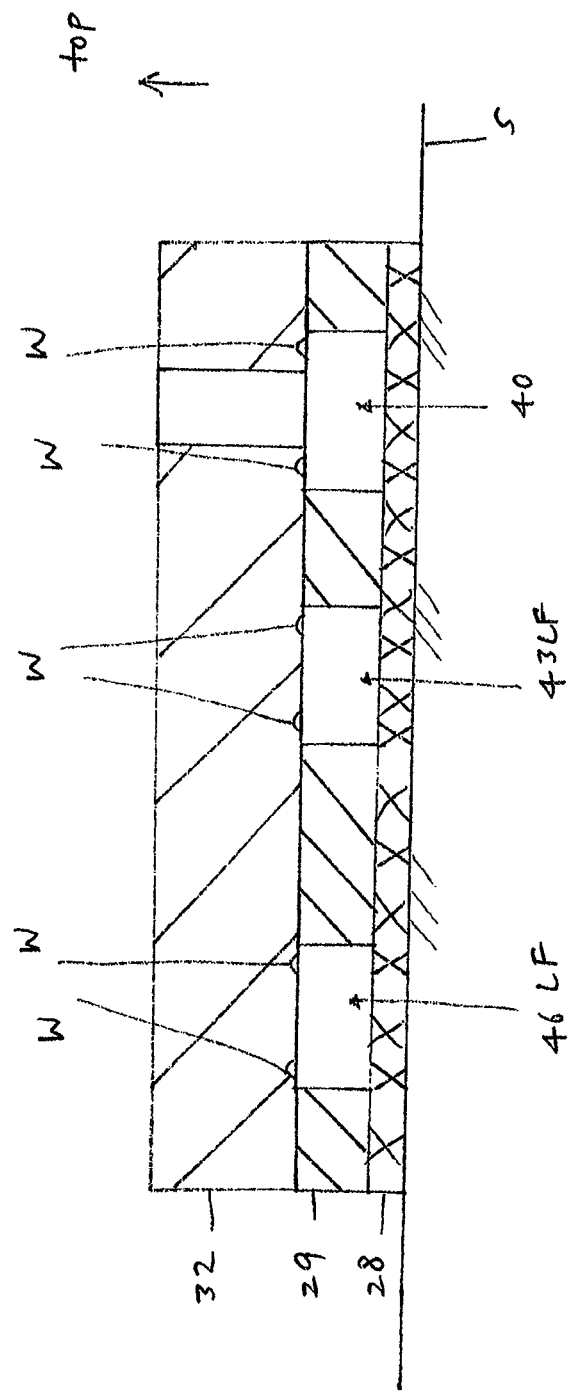
FIG. 10 illustrates another step of producing the inlay.
Figure 23:
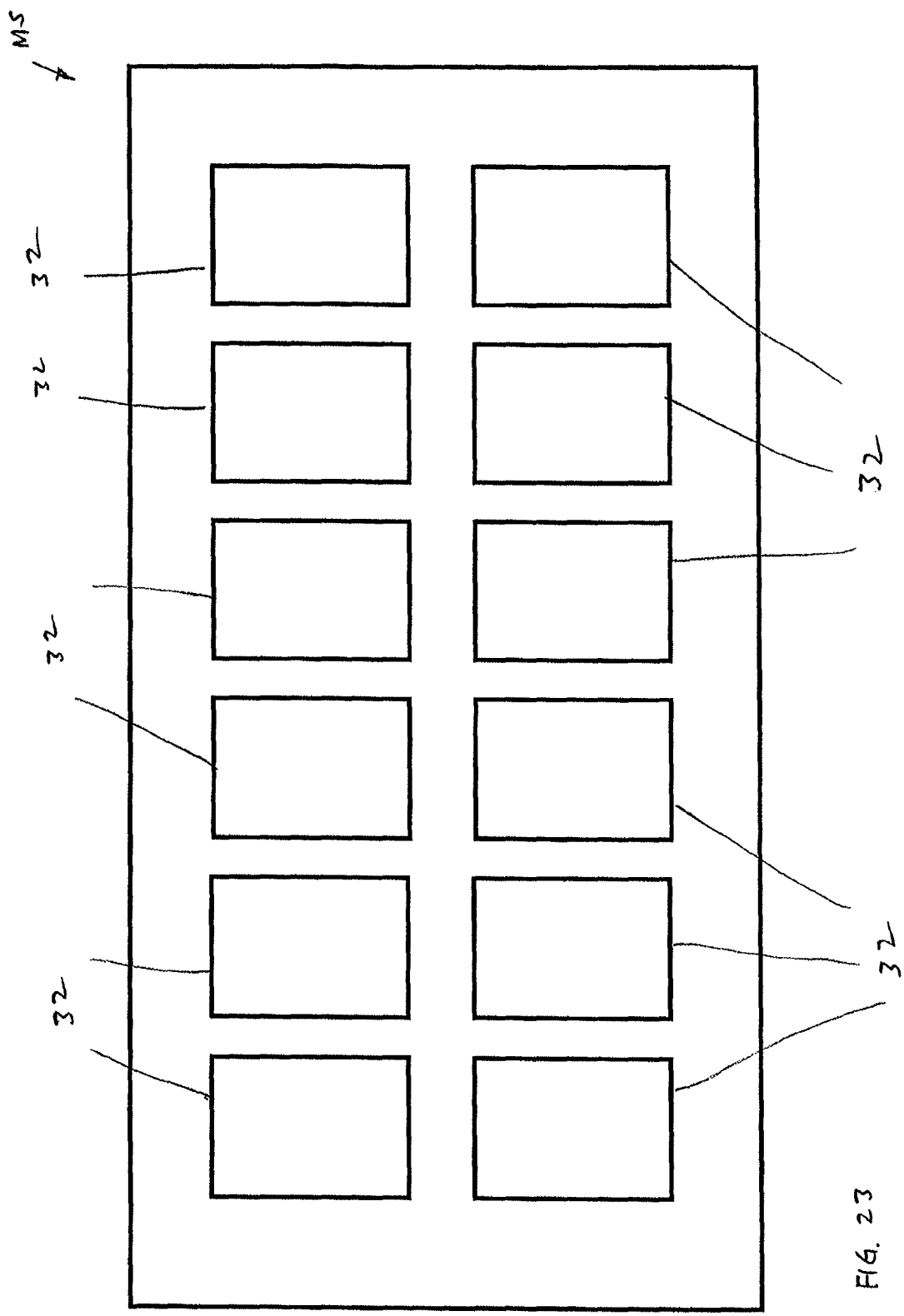
FIG. 23 illustrates a large material sheet that includes a plurality of sheets for producing the card of FIG. 1.

A thickness compensation sheet 32 is provided as one of a plurality of compensation sheets in a large material sheet MS. The large material sheet MS is illustrated in FIG. 23. The thickness compensation sheet 32 is punched to provide an opening to receive the moulded part 40MP of the secure processing module 40. The thickness compensation sheet 32 is later placed on the 29S2 of the antenna carrier sheet 29 such the thickness compensation sheet 32 covers the outer end of the antenna carrier sheet 29. The placing is also done such the opening of the thickness compensation sheet 32 receives the moulded part 40MP, as illustrated in FIG. 10.

The partial inlay 12 is then flipped or turned over, wherein the self-adhesive tape 28 is then removed and replaced by a first transparent overlay sheet 27 is provided as one of a plurality of transparent overlay sheets in a large material sheet.

The partial inlay 12 is later flipped over again, wherein the first transparent overlay sheet 27 is resting and touching the support surface S, as seen FIG. 11.

Figure 11:
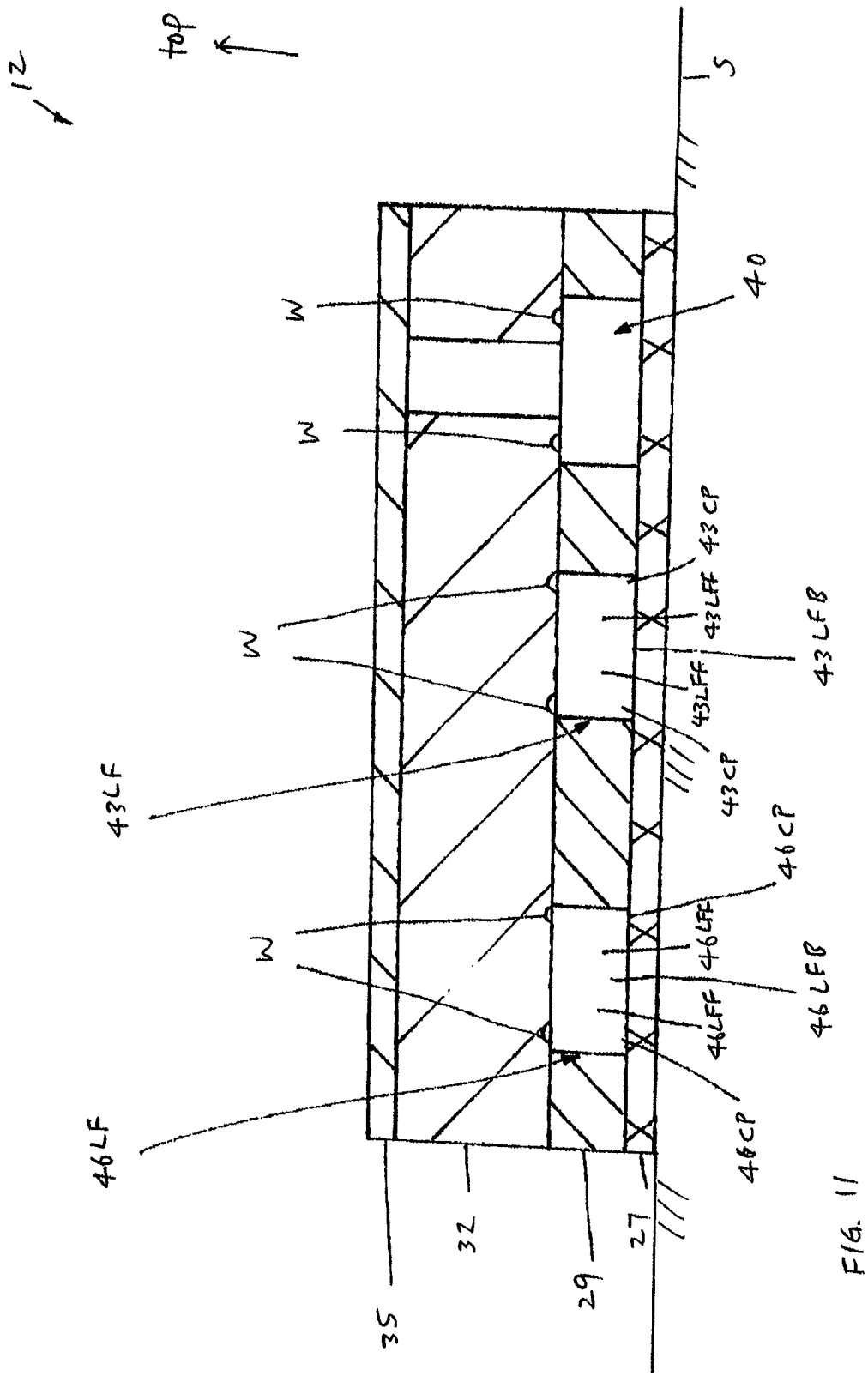
FIG. 11 illustrates a further step of producing the inlay.

A second transparent overlay sheet 35 is provided as one of a plurality of transparent overlay sheets in a large material sheet and it is placed on the thickness compensation sheet 32 such that the second transparent overlay sheet 35 covers the thickness compensation sheet 32, as illustrated in FIG. 11.

The first transparent overlay sheet 27, the antenna carrier sheet 29, the thickness compensation sheet 32, and the second transparent overlay sheet 35 are then laminated, wherein these sheets are pressed against each other to form the complete inlay 12. In short, the lamination bonds or attaches the respective sheets to each other, thereby collating or bonding a stack of large material sheets.

Different from a printed circuit board, the electrical wires W allows flexible electrical connections between the secure processing module 40 and the module lead frame contact pads 43CP and between the secure processing module 40 and the sensor lead frame contact pads 46CP. The electrical connections can be configured easily by simply setting software parameters for defining required connections between parts. A user can then easily adapt its production process to use a different part with a different contact pad configuration. This is different from the printed circuit board that provides fixed electrical connections between parts.

A method of producing a card using the inlay 12 is described below.

Figure 12:
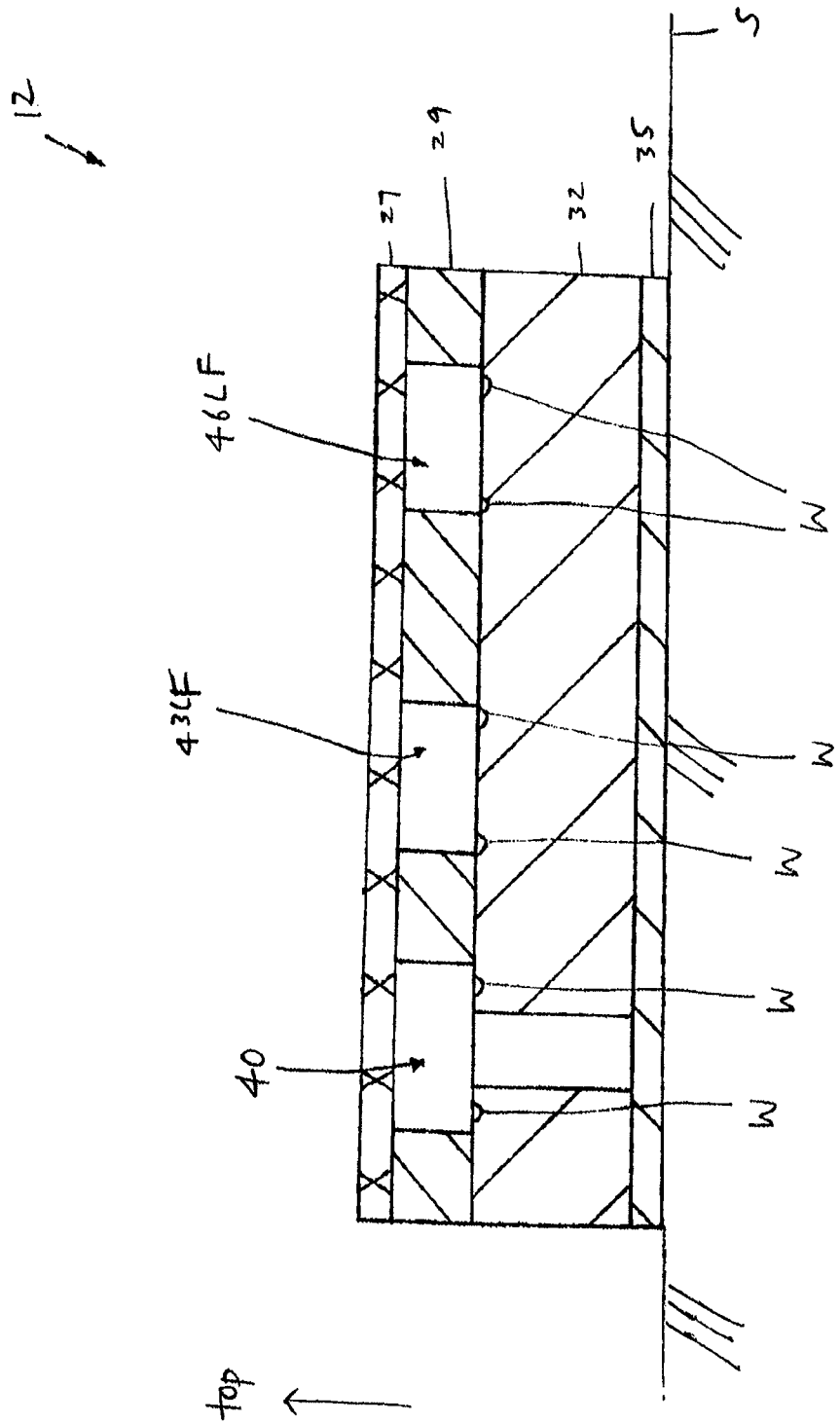
FIG. 12 illustrates one step of producing the card of FIG. 1.

The method includes a step of resting the inlay 12 on the support surface S, wherein the second transparent overlay sheet 35 is touching the support surface S, as illustrated in FIG. 12.

Figure 13:
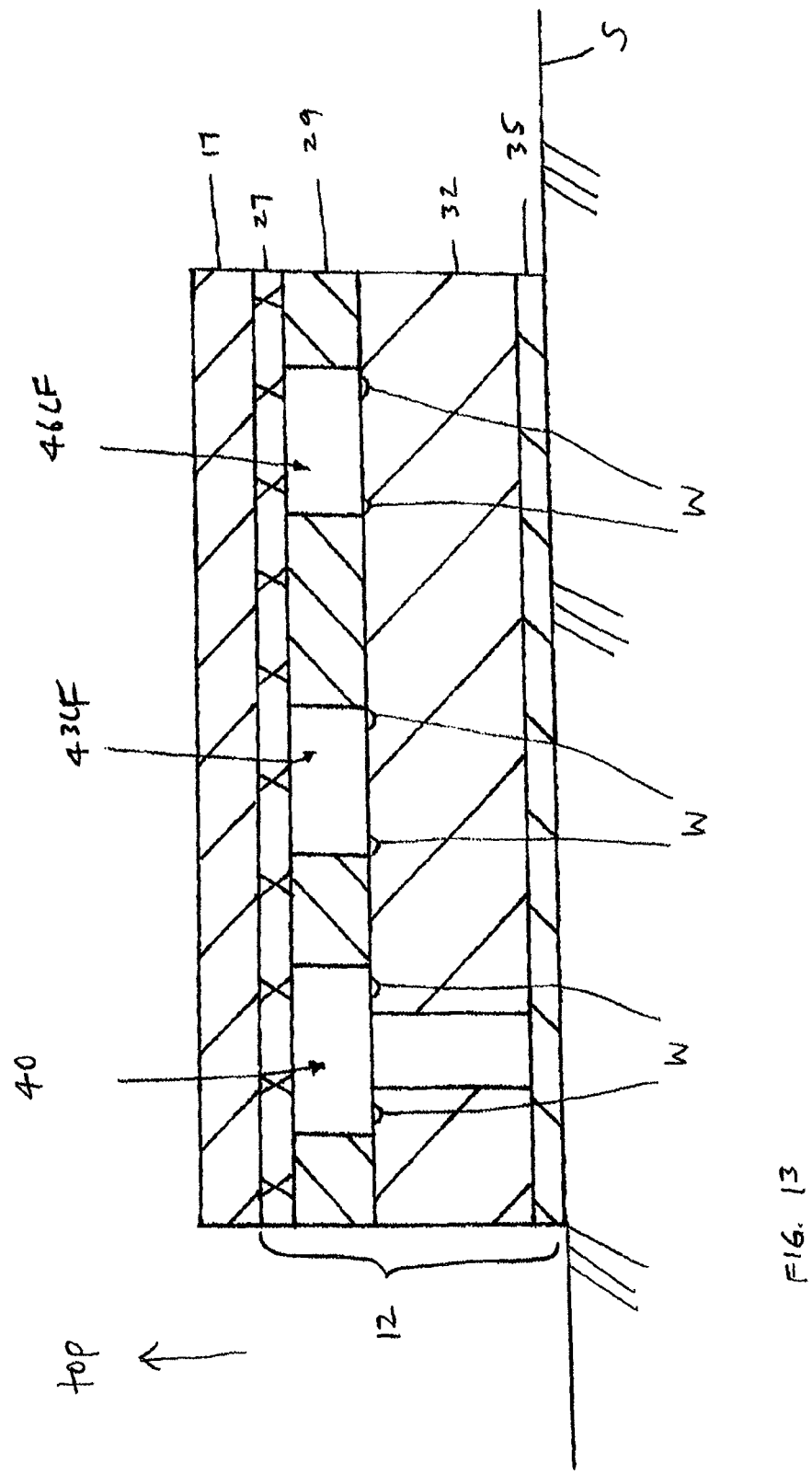
FIG. 13 illustrates a further step of producing the card of FIG. 1.

A first printed PVC sheet 17 as one of a plurality of printed PVC sheets in a large material sheet is then provided and it is placed on the first transparent overlay sheet 27 of the inlay 12, such that the first printed PVC sheet 17 covers the first transparent overlay sheet 27, as illustrated in FIG. 13.

Figure 14:
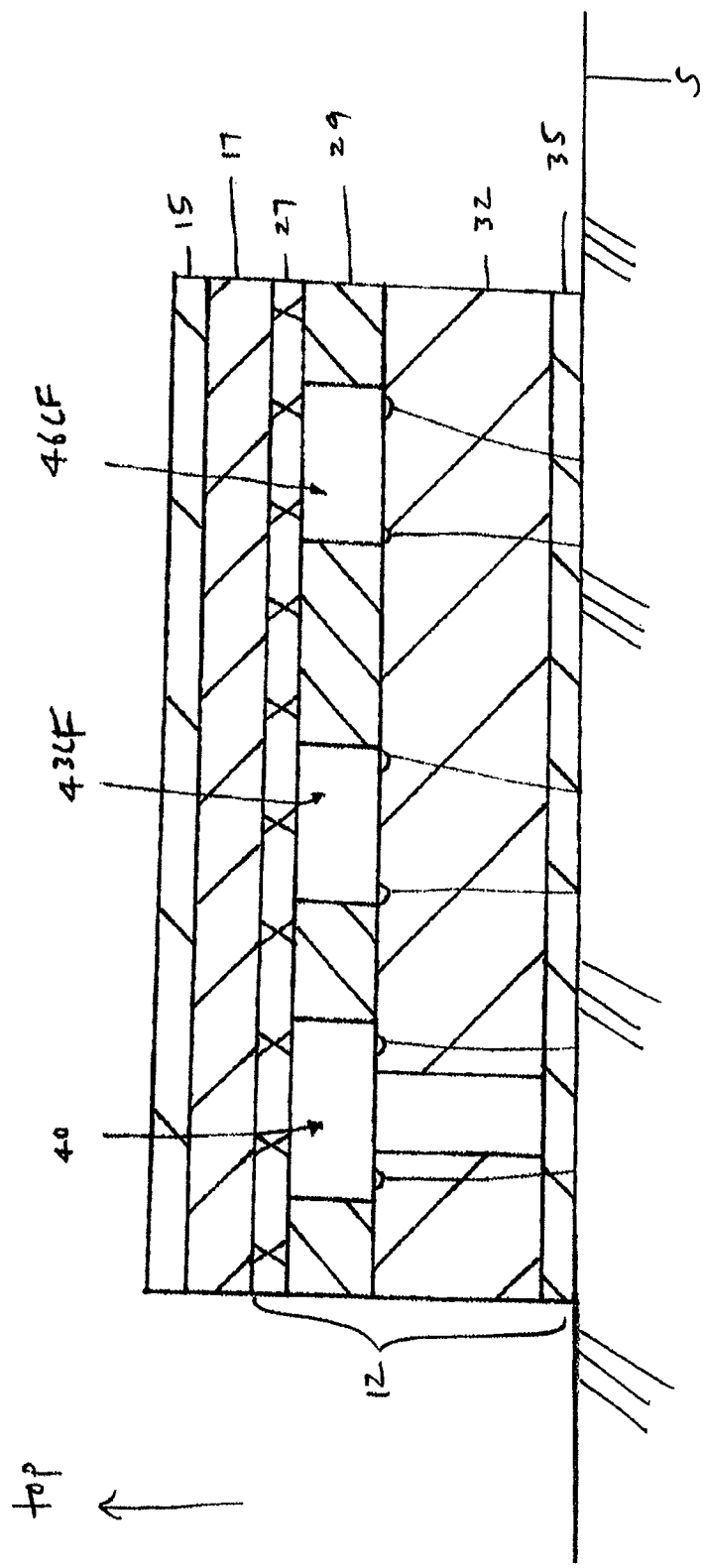
FIG. 14 illustrates a further of producing the card of FIG. 1.

A first transparent PVC sheet 15 is then provided as one of a plurality of transparent PVC sheets in a large material sheet and it is then placed on the first printed PVC sheet 17 such that the first transparent PVC sheet 15 covers the first printed PVC sheet 17, as illustrated in FIG. 14.

Figure 15:
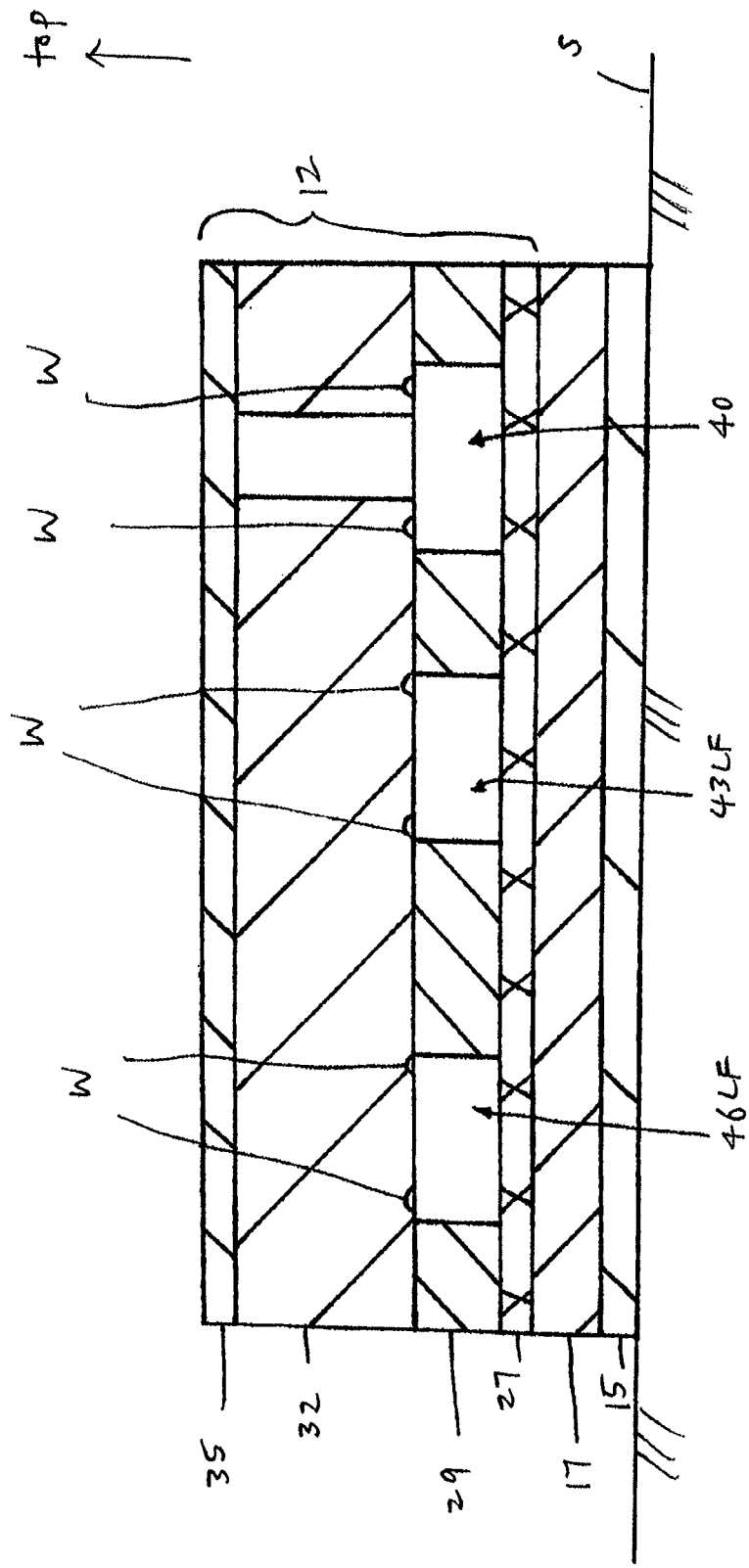
FIG. 15 illustrates another step of producing the card of FIG. 1.

The partial card 10 is then flipped over such that the first transparent PVC sheet 15 is resting on and touching the support surface S, as illustrated in FIG. 15.

Figure 16:
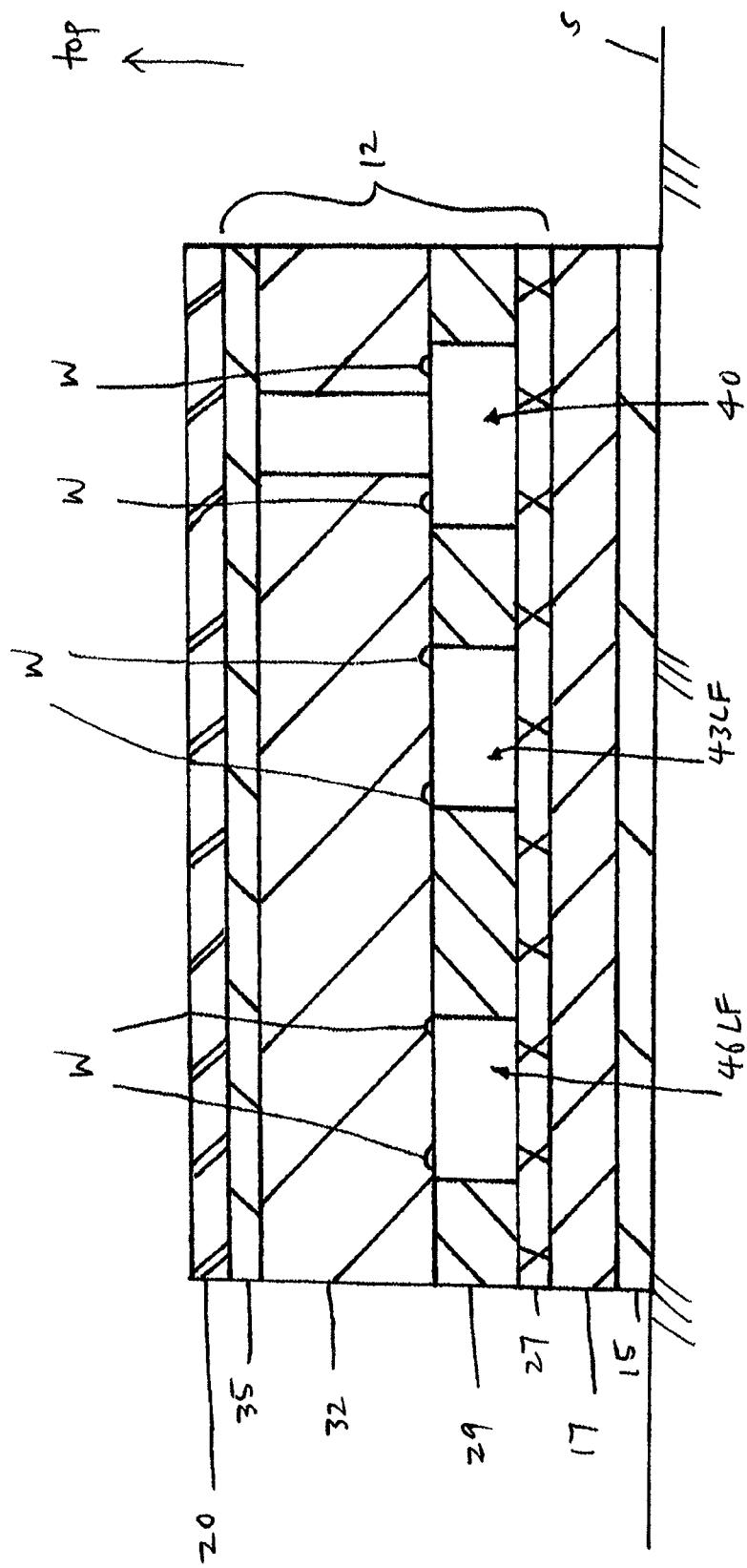
FIG. 16 illustrates a further step of producing the card of FIG. 1.

An intermediate transparent PVC sheet 20 is provided as one of a plurality of intermediate transparent PVC sheets in a large material sheet and it is afterward placed on the second transparent overlay sheet 35 of the inlay 12 such that the intermediate transparent PVC sheet 20 covers the second transparent overlay sheet 35, as illustrated in FIG. 16.

Figure 17:
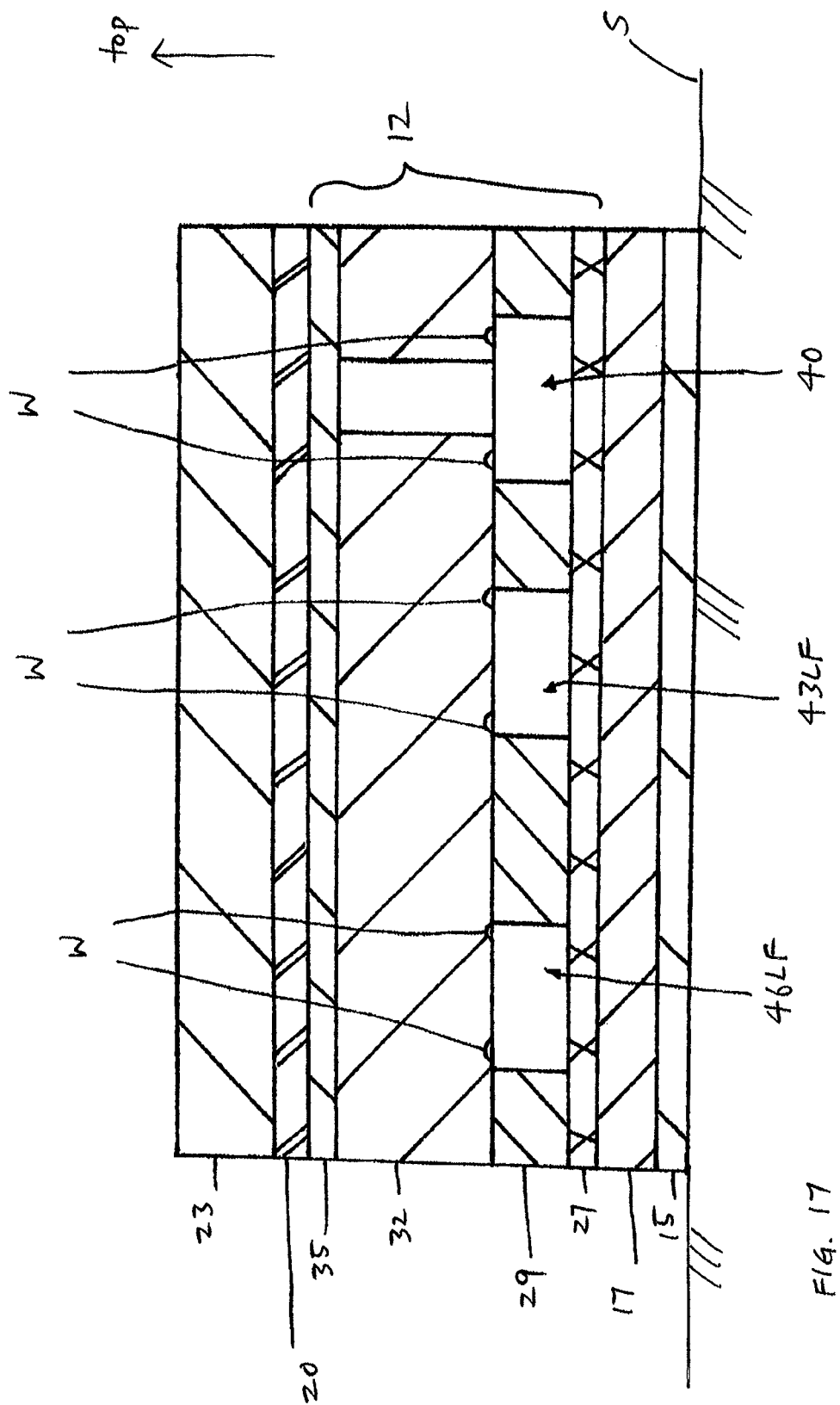
FIG. 17 illustrates another further step of producing the card of FIG. 1.

A second printed PVC sheet 23 is provided as one of a plurality of printed PVC sheets in a large material sheet and it is later placed on the intermediate transparent PVC sheet 20 such that the second printed PVC sheet 23 covers the intermediate transparent PVC sheet 20, as illustrated in FIG. 17.

In a further embodiment shown in FIG. 21, the intermediate transparent PVC sheet 20 is left away.

Figure 18:
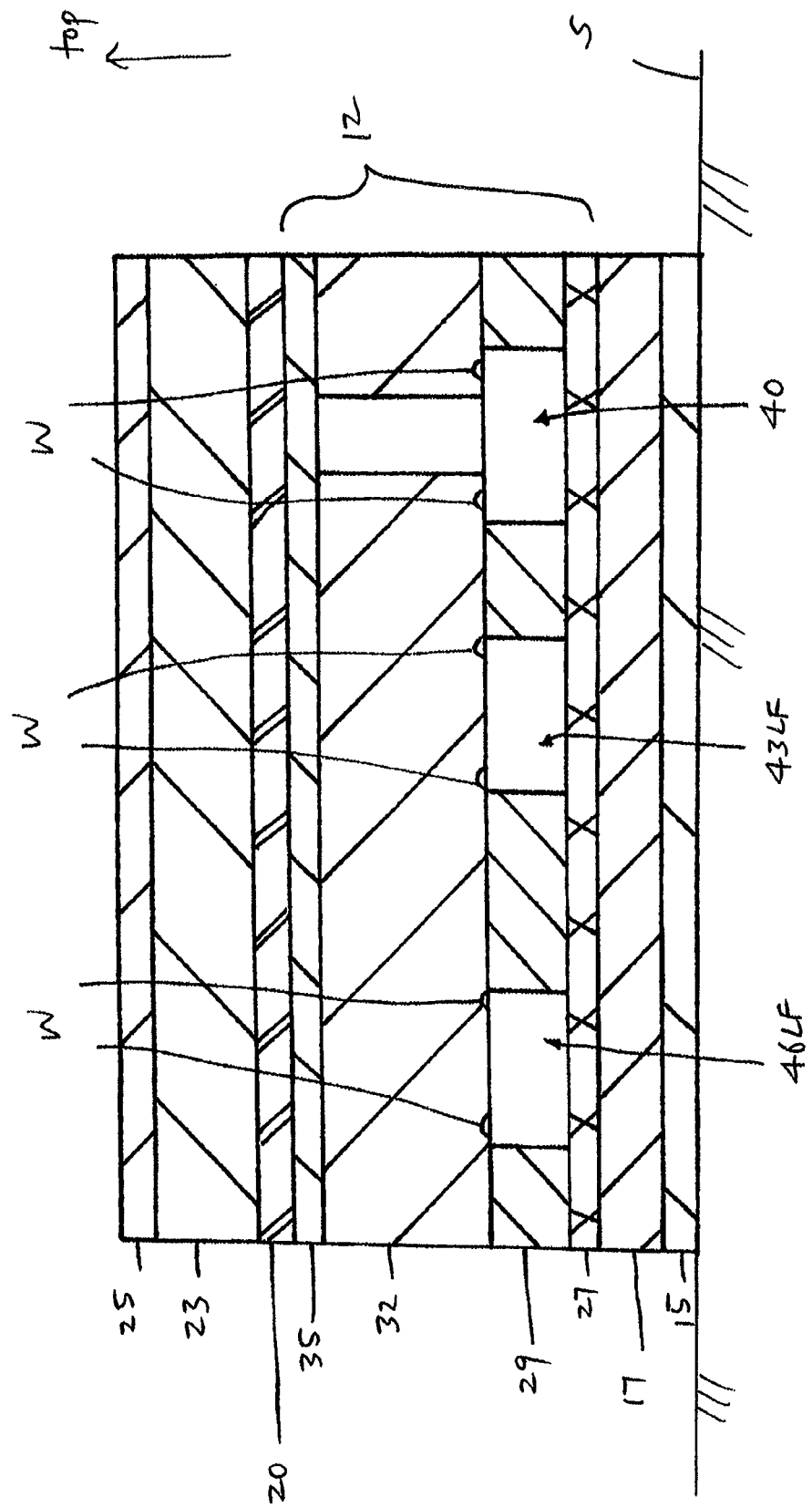
FIG. 18 illustrates another step of producing the card of FIG. 1.

A second transparent PVC sheet 25 is provided as one of a plurality of transparent PVC sheets in a large material sheet and it is afterward placed on the second printed PVC sheet 23 such that the second transparent PVC sheet 25 covers the second printed PVC sheet 23, as illustrated in FIG. 18.

Figure 19:
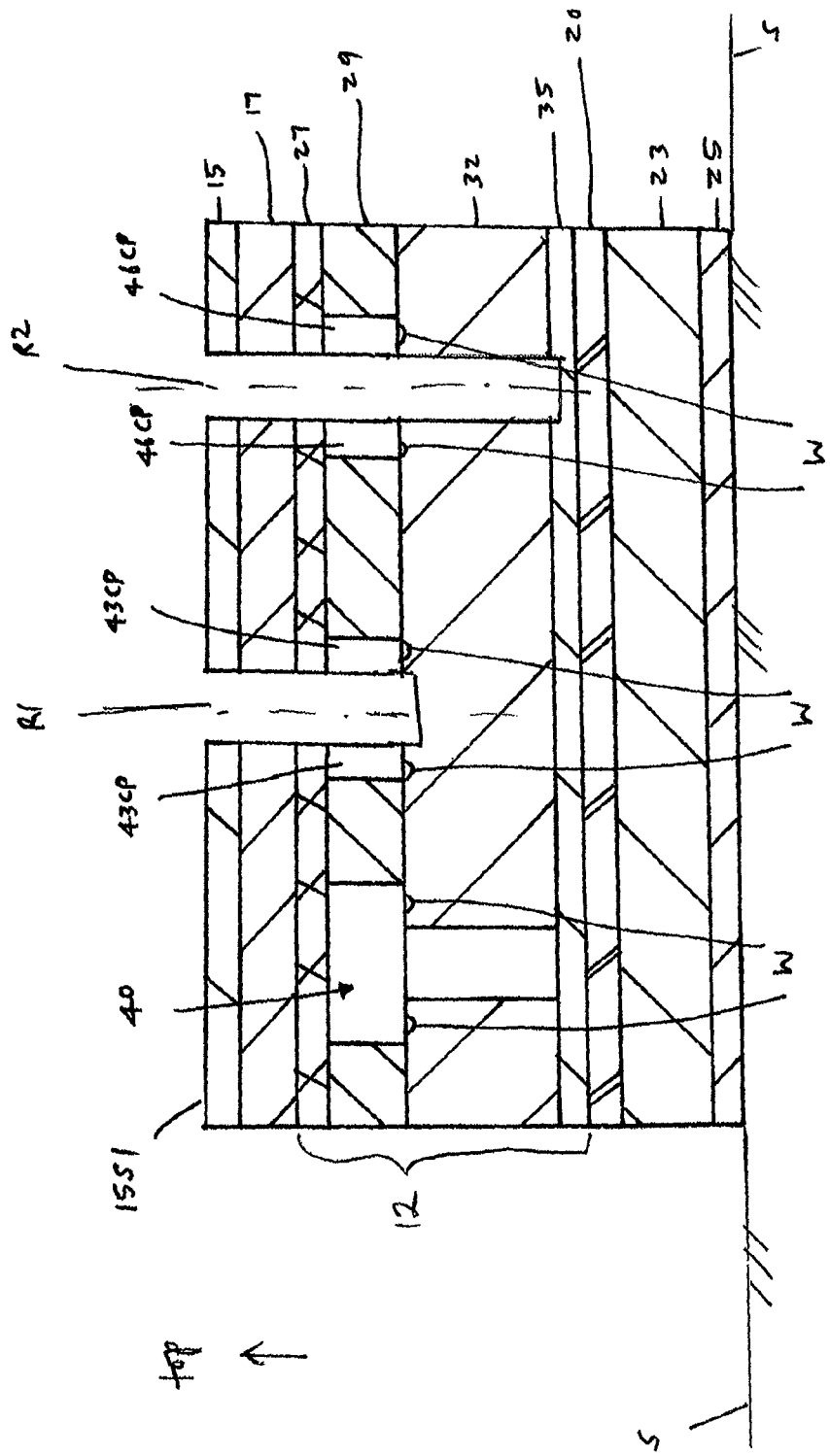
FIG. 19 illustrates a further step of producing the card of FIG. 1.

After this, the second transparent PVC sheet 25 is placed on the support surface S, as illustrated in FIG. 19.

A sharp rotating tool is then applied perpendicularly to the first major surface 15S1 to cut or mill into the first major surface 15S1. The milling is done deep enough such that the module lead frame body 43LFB is cut such that it is electrically detached from the module lead frame contact pads 43CP. The milling creates a recess R1 that extends from the first major surface 15S1 to the module lead frame body 43LFB.

This milling also creates a shallow hole in the thickness compensation sheet 32. In other words, the recess R1 extends from the first major surface 15S1 into a part of the thickness compensation sheet 32. The recess R1 is shown in FIG. 19.

Similarly, the first major surface 15S1 is milled into the partial card 10 such that the sensor lead frame body 46LFB is cut such that it is electrically detached from the sensor lead frame contact pads 46CP. The milling creates a recess R2 that extends from the first major surface 15S1 to the sensor lead frame body 46LFB. This recess R2 is shown in FIG. 19.

Figure 20:
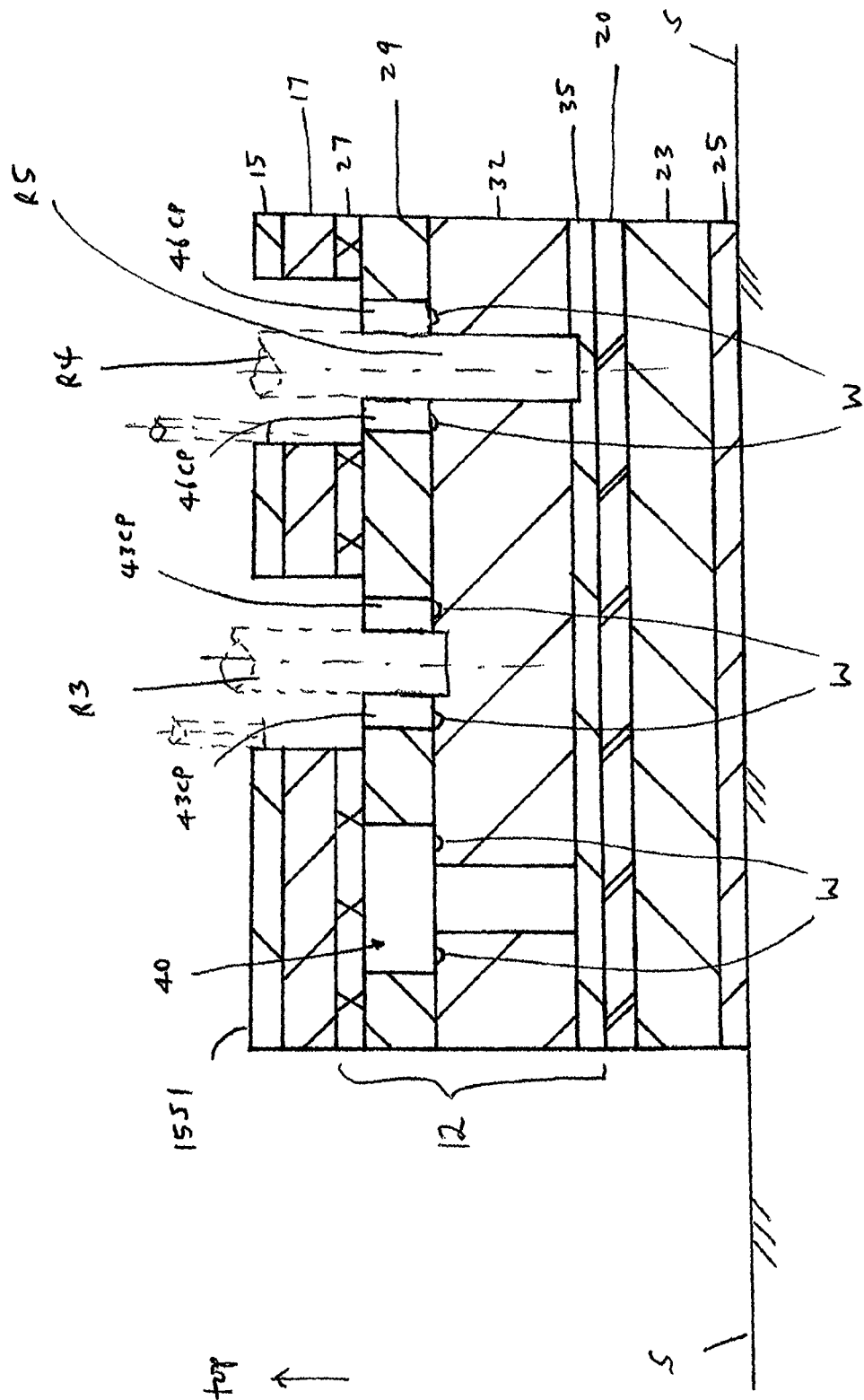
FIG. 20 illustrates a ninth step of producing the card of FIG. 1.

This milling also creates a hole or recess R5 that goes through the thickness compensation sheet 32 and into the second transparent overlay sheet 35. The recess R5 extends from the thickness compensation sheet 32 and into the second transparent overlay sheet 35. This recess R5 is large enough to receive the second rectangular part 46P2 of the fingerprint sensor 46. The recess R5 is shown in FIG. 20.

The first major surface 15S1 is then milled again to create a bigger recess R3 that extends from the first major surface 15S1 to the module lead frame contact pads 43CP. This recess R3 is large enough to receive the contact module 43. The milling also exposes the module lead frame contact pads 43CP. The recess R3 is shown in FIG. 20. Put differently, the milling eats into the module lead frame contact pads 43CP.

The first major surface 15S1 is then milled again to create a bigger recess R4 that extends the first major surface 15S1 to the sensor lead frame contact pads 46CP. This recess is large enough to receive the first rectangular part 46P1 of the fingerprint sensor 46. The milling also exposes the sensor lead frame contact pads 46CP. The recess R4 is shown in FIG. 20. The milling eats into the sensor lead frame contact pads 46CP.

In another embodiment not shown here, the milling steps can also be applied in a reversed order or other sequence. In other words, the milling step to electrically detach the module lead frame body 43LFB from the module lead frame contact pads 43CP can be done before or after the step of milling to create recess R3. Similarly, the milling step to electrically detach the sensor lead frame body 46LFB from the sensor lead frame contact pads 46CP can be done before or after the step of milling to create the recess R4.

An electrically conductive substance is later placed either on the inner module contact pads of the contact module 43 or on the exposed module lead frame contact pads 43CP.

The contact module 43 is later inserted in the respective recess such that the inner module contact pads of the contact module 43 are electrically connected to the module lead frame contact pads 43CP via the electrically conductive substance.

Similarly, an electrically conductive substance is later placed either on the inner sensor contact pads of the fingerprint sensor 46 or on the exposed sensor lead frame contact pads 46CP.

The fingerprint sensor 46 is then inserted in the respective recess such that the inner sensor contact pads of the fingerprint sensor 46 are electrically connected to the sensor lead frame contact pads 46CP via the electrically conductive substance to form the complete card 10, as illustrated in FIG. 1.

The embodiments can also be described with the following lists of features or elements being organized into an item list. The respective combinations of features, which are disclosed in the item list, are regarded as independent subject matter, respectively, that can also be combined with other features of the application.

1. An inlay (12) for a card (10), the inlay (12) comprising
   a first transparent overlay sheet (27),
   an antenna carrier sheet (29) being provided next to the first transparent overlay sheet (27), the antenna carrier sheet (29) comprising a microcontroller opening (O1), a contact module lead frame opening (O2), and a finger sensor lead frame opening (O3),
   a thickness compensation sheet (32) being provided next to the antenna carrier sheet (29),
   a second transparent overlay sheet (35) being provided next to the thickness compensation sheet (32),
   a microcontroller (40) being provided in the microcontroller opening (O1),
   a module lead frame (43LF) being adapted for being milled and being provided in the contact module lead frame opening (O2), the module lead frame (43LFB) comprising a plurality of first contact pads (43CP) for contacting a contact module (43),
   a finger sensor lead frame (46LF) being adapted for being milled and being provided in the sensor lead frame opening (O3), the sensor lead frame (46LF) comprising a plurality of second contact pads (46CP) for contacting a fingerprint sensor (46),
   an antenna (A) comprising a coil of conductor being embedded in the antenna carrier sheet (29), and
   a plurality of electrical wires (W) being connected to the microcontroller (40), to the first contact pads (43CP), to the second contact pads (46CP), and to the antenna (A).

2. The inlay (12) according to item 1, wherein
   at least one electrical wire overlaps with another electrical wire.
3. The inlay (12) according to item 1 or 2 further comprising
   an intermediate transparent PVC sheet (20) being provided next to the second transparent overlay sheet (35).
4. A method of producing an inlay, the method comprising
   providing an antenna carrier sheet (29),
   providing the antenna carrier sheet (29) with a first opening (O1) for receiving a printed circuit board (40PCB) of a microcontroller (40), a second opening (O2) for receiving a module lead frame (43LF) and a third opening (O3) for receiving a sensor lead frame (46LF),
   providing an adhesive tape (28) next to the antenna carrier sheet (29),
   inserting the printed circuit board (40PCB) into the first opening (O1), inserting the module lead frame (43LF) into the second opening (O2), inserting the sensor lead frame (46LF) into the third opening (O3), wherein the printed circuit board (40PCB), the module lead frame (43LF), and the sensor lead frame (46LF) are attached to the adhesive tape (28),
   embedding an antenna (A) comprising a coil of conductor in the antenna carrier sheet (29),
   attaching a plurality of electrical wires (W) to electrical contact pads of the printed circuit board (40PCB), to the module lead frame (43LF), to the sensor lead frame (46LF), and to the antenna (A),
   providing a thickness compensation sheet (32) with an opening to receive a moulded part (40MP) of the microcontroller (40),
   providing the thickness compensation sheet (32) next to the antenna carrier sheet (29),
   removing the adhesive tape (28) from the antenna carrier sheet (29),
   providing a first transparent overlay sheet (27) next to the antenna carrier sheet (29), and
   providing a second transparent overlay sheet (35) next to the thickness compensation sheet (32).
5. The method according to item 4 further comprising
   providing an intermediate transparent PVC sheet (20) next to the second transparent overlay sheet (35).
6. A card (10) comprising
   an inlay (12) comprising
   a first transparent overlay sheet (27),
   an antenna carrier sheet (29) being provided next to the first transparent overlay sheet (27), the antenna carrier sheet (29) comprising a microcontroller opening (O1), a module lead frame opening (O2), and a sensor lead frame opening (O3),
   a thickness compensation sheet (32) being provided next to the antenna carrier sheet (29),
   a second transparent overlay sheet (35) being provided next to the thickness compensation sheet (32),
   a microcontroller (40) being provided in the microcontroller opening (O1),
   first contact pads (43CP) of a module lead frame (43LFB) being provided in the module lead frame opening (O2),
   second contact pads (46CP) of a sensor lead frame (46LF) being provided in the sensor lead frame opening (O3),
   an antenna (A) comprising a coil of conductor being embedded in the antenna carrier sheet (29),
   a plurality of electrical wires (W) being connected to the microcontroller (40), to the first contact pads (43CP), to the second contact pads, and to the antenna (A),
   the card further comprising
   a first printed PVC sheet (17) being provided next to a first transparent overlay sheet (27) of the inlay (12),
   a first transparent PVC sheet (15) being provided next to the first printed PVC sheet (17),
   a second printed PVC sheet (23) being provided next a second transparent overlay sheet (35) of the inlay (12),
   a second printed PVC sheet (23) being provided next to the intermediate transparent PVC sheet (20),
   a second transparent PVC sheet (25) being provided next to the second printed PVC sheet (23),
   wherein the first transparent PVC sheet (15), the first printed PVC sheet (17), and the first transparent overlay sheet (27) comprise a contact module opening and a fingerprint sensor opening,
   a contact module (43) being provided in the contact module opening and being electrically connected to the first contact pads (43CP) (via an electrically conductive substance), and
   a fingerprint sensor (46) being provided in the fingerprint sensor opening and being electrically connected to the second contact pads (46CP) (via an electrically conductive substance).
7. The card according to item 6 furthering comprising
   an intermediate transparent PVC sheet (20) being provided between the second transparent overlay sheet (35) and the second printed PVC sheet (23).
8. The card according to one of items 6 to 7, wherein
   at least one electrical wire overlaps with another electrical wire.
9. The card according to one of items 6 to 8 further comprising
   a first electrically conductive substance for electrically connecting the contact module (43) to the first contact pads (43CP).
10. The card according to one of items 6 to 9 further comprising
    a second electrically conductive substance for electrically connecting the fingerprint sensor (46) to the second contact pads (46CP).
11. A method of producing a card, the method comprising
    providing an inlay according to item 4 or 5,
    providing a first printed PVC sheet (17) next to a first transparent overlay sheet (27) of the inlay (12),
    providing a first transparent PVC sheet (15) next to the first transparent PVC sheet (15),
    providing a second printed PVC sheet (23) next to a second transparent overlay sheet (35) of the inlay (12),
    providing a second transparent PVC sheet (25) next to the second printed PVC sheet (23),
    milling a first major surface (15S1) of the first transparent PVC sheet (15) such that a module lead frame body (43LFB) of a module lead frame (43LF) is electrically detached from module lead frame contact pads (43CP) of the module lead frame (43LF),
    milling the first major surface (15S1) such that a sensor lead frame body (46LFB) of a sensor lead frame (46LF) is electrically detached from sensor lead frame contact pads (46CP) of the sensor lead frame (46LF),
    milling the first major surface (15S1) for providing a first recess to receive a contact module (43), and milling the first major surface (15S1) for providing a second recess to receive a fingerprint sensor (46).
12. The method according to item 11 furthering comprising inserting a contact module (43) into the first recess, wherein the contact module (43) is electrically connected to the module lead frame contact pads (43CP) and
inserting a fingerprint sensor (46) into the second recess, wherein the fingerprint sensor (46) is electrically connected to the sensor lead frame contact pads (46CP).
13. The method according to item 11 or 12 further comprising
providing a first electrically conductive substance to electrically connect the contact module (43) to the module lead frame contact pads (43CP).
14. The method according to one of items 11 to 13 further comprising
providing a second electrically conductive substance to electrically connect the fingerprint sensor (46) to the sensor lead frame contact pads (46CP).

Although the above description contains much specificity, this should not be construed as limiting the scope of the embodiments but merely providing illustration of the foreseeable embodiments. The above stated advantages of the embodiments should not be construed especially as limiting the scope of the embodiments but merely to explain possible achievements if the described embodiments are put into practice. Thus, the scope of the embodiments should be determined by the claims and their equivalents, rather than by the examples given.

REFERENCE NUMBERS 10 card
12 inlay
15 first transparent PVC sheet
15S1 first major surface
15S2 second major surface
17 first printed PVC sheet
17S1 first major surface
17S2 second major surface
20 intermediate transparent PVC sheet
20S1 first major surface
20S2 second major surface
23 second printed PVC sheet
23S1 first major surface
23S2 second major surface
25 second transparent PVC sheet
25S1 first major surface
25S2 second major surface
27 first transparent overlay sheet
27S1 first major surface
27S2 second major surface
28 adhesive tape
29 antenna carrier sheet
29S1 first major surface
29S2 second major surface
32 thickness compensation sheet
32S1 first major surface
32S2 second major surface
35 second transparent overlay sheet
35S1 first major surface
35S2 second major surface
40 secure processing module, microcontroller
40MP moulded part
40PCB printed circuit board
43 contact module
43CP module lead frame contact pad
43CP1 first end
43CP2 second end
43LF module lead frame
43LFB module lead frame body
43LFF module lead frame finger
46 fingerprint sensor
46CP sensor lead frame contact pad
46CP1 first end
46CP2 second end
46LF sensor lead frame
46LFB sensor lead frame body
46LFF sensor lead frame finger
46P1 first rectangular part
46P2 second rectangular part
A antenna
C channel
MS material sheet
O1 opening
O2 opening
O3 opening
R1 recess
R2 recess
R3 recess
R4 recess
R5 recess
S support surface
W module electrical wire

The invention claimed is:

1. An inlay for a card, the inlay comprising:
a first transparent overlay sheet,
an antenna carrier sheet being provided next to the first transparent overlay sheet, the antenna carrier sheet comprising a microcontroller opening, a contact module lead frame opening, and a finger sensor lead frame opening,
a thickness compensation sheet being provided next to the antenna carrier sheet,
a second transparent overlay sheet being provided next to the thickness compensation sheet,
a microcontroller being provided in the microcontroller opening,
a module lead frame being adapted for being milled and being provided in the contact module lead frame opening, the module lead frame comprising a plurality of first contact pads for contacting a contact module,
a finger sensor lead frame being adapted for being milled and being provided in the finger sensor lead frame opening, the finger sensor lead frame comprising a plurality of second contact pads for contacting a fingerprint sensor,
an antenna comprising a coil of a conductor being embedded in the antenna carrier sheet, and
a plurality of electrical wires being connected to the microcontroller, to the first contact pads, to the second contact pads, and to the antenna.

2. The inlay according to claim 1, wherein
at least one electrical wire overlaps with another electrical wire.

3. The inlay according to claim 1 further comprising
an intermediate transparent PVC sheet being provided next to the second transparent overlay sheet.

4. A method of producing an inlay, the method comprising:
providing an antenna carrier sheet,
providing the antenna carrier sheet with a first opening for receiving a printed circuit board of a microcontroller, a second opening for receiving a module lead frame and a third opening for receiving a sensor lead frame, providing an adhesive tape next to the antenna carrier sheet, inserting the printed circuit board into the first opening, inserting the module lead frame into the second opening, inserting the sensor lead frame into the third opening, wherein the printed circuit board, the module lead frame, and the sensor lead frame are attached to the adhesive tape, embedding an antenna comprising a coil of a conductor in the antenna carrier sheet, attaching a plurality of electrical wires to electrical contact pads of the printed circuit board, to the module lead frame, to the sensor lead frame, and to the antenna, providing a thickness compensation sheet with an opening to receive a molded part of the microcontroller, providing the thickness compensation sheet next to the antenna carrier sheet, removing the adhesive tape from the antenna carrier sheet, providing a first transparent overlay sheet next to the antenna carrier sheet, and providing a second transparent overlay sheet next to the thickness compensation sheet.

5. The method according to claim 4 further comprising providing an intermediate transparent PVC sheet next to the second transparent overlay sheet.

6. A card comprising:

an inlay comprising
- a first transparent overlay sheet,
- an antenna carrier sheet being provided next to the first transparent overlay sheet, the antenna carrier sheet comprising a microcontroller opening, a module lead frame opening, and a sensor lead frame opening,
- a thickness compensation sheet being provided next to the antenna carrier sheet,
- a second transparent overlay sheet being provided next to the thickness compensation sheet,
- a microcontroller being provided in the microcontroller opening,
- first contact pads of a module lead frame being provided in the module lead frame opening,
- second contact pads of a sensor lead frame being provided in the sensor lead frame opening,
- an antenna comprising a coil of conductor being embedded in the antenna carrier sheet, and
- a plurality of electrical wires being connected to the microcontroller, to the first contact pads, to the second contact pads, and to the antenna;

a first printed PVC sheet being provided next to a first transparent overlay sheet of the inlay, a first transparent PVC sheet being provided next to the first printed PVC sheet, a second printed PVC sheet being provided next to a second transparent overlay sheet of the inlay, and a second transparent PVC sheet being provided next to the second printed PVC sheet, wherein:
- the first transparent PVC sheet, the first printed PVC sheet, and the first transparent overlay sheet comprise a contact module opening and a fingerprint sensor opening,
- a contact module is provided in the contact module opening and is electrically connected to the first contact pads via a first electrically conductive substance, and
- a fingerprint sensor is provided in the fingerprint sensor opening and is electrically connected to the second contact pads via a second electrically conductive substance.

7. The card according to claim 6 furthering comprising an intermediate transparent PVC sheet being provided between the second transparent overlay sheet and the second printed PVC sheet.

8. The card according to claim 6, wherein at least one electrical wire overlaps with another electrical wire.

9. The card according to claim 6 further comprising a first electrically conductive substance for electrically connecting the contact module to the first contact pads.

10. The card according to claim 6 further comprising a second electrically conductive substance for electrically connecting the fingerprint sensor to the second contact pads.

11. A method of producing a card, the method comprising:

producing an inlay, producing the inlay comprising
- providing an antenna carrier sheet,
- providing the antenna carrier sheet with a first opening for receiving a printed circuit board of a microcontroller, a second opening for receiving a module lead frame and a third opening for receiving a sensor lead frame,
- providing an adhesive tape next to the antenna carrier sheet,
- inserting the printed circuit board into the first opening, inserting the module lead frame into the second opening, inserting the sensor lead frame into the third opening, wherein the printed circuit board, the module lead frame, and the sensor lead frame are attached to the adhesive tape,
- embedding an antenna comprising a coil of a conductor in the antenna carrier sheet,
- attaching a plurality of electrical wires to electrical contact pads of the printed circuit board, to the module lead frame, to the sensor lead frame, and to the antenna,
- providing a thickness compensation sheet with an opening to receive a molded part of the microcontroller,
- providing the thickness compensation sheet next to the antenna carrier sheet,
- removing the adhesive tape from the antenna carrier sheet,
- providing a first transparent overlay sheet next to the antenna carrier sheet,
- providing a second transparent overlay sheet next to the thickness compensation sheet, providing a first printed PVC sheet next to a first transparent overlay sheet of the inlay, providing a first transparent PVC sheet next to the first transparent PVC sheet, providing a second printed PVC sheet next to a second transparent overlay sheet of the inlay, providing a second transparent PVC sheet next to the second printed PVC sheet, milling a first major surface of the first transparent PVC sheet such that a module lead frame body of a module lead frame is electrically detached from module lead frame contact pads of the module lead frame, milling the first major surface such that a sensor lead frame body of a sensor lead frame is electrically detached from sensor lead frame contact pads of the sensor lead frame, milling the first major surface to define a first recess to receive a contact module, and milling the first major surface to define a second recess to receive a fingerprint sensor.

12. The method according to claim 11 furthering comprising:

inserting a contact module into the first recess, wherein the contact module is electrically connected to the module lead frame contact pads and inserting a fingerprint sensor into the second recess, wherein the fingerprint sensor is electrically connected to the sensor lead frame contact pads.

13. The method according to claim 11 further comprising providing a first electrically conductive substance to electrically connect the contact module to the module lead frame contact pads.

14. The method according to claim 11 further comprising providing a second electrically conductive substance to electrically connect the fingerprint sensor to the sensor lead frame contact pads.

* * * * *